United States Patent [19]

Sugimoto

[11] Patent Number: 5,370,793
[45] Date of Patent: Dec. 6, 1994

[54] CIRCULATING FLUID PURIFICATION APPARATUS AND POOL WATER PURIFYING SYSTEM USING THE SAME

[76] Inventor: Akitoshi Sugimoto, 244, Mama, Kochi-shi, Kochi, Japan

[21] Appl. No.: 59,989

[22] Filed: May 12, 1993

Related U.S. Application Data

[62] Division of Ser. No. 721,087, Jun. 25, 1991, Pat. No. 5,244,585.

[30] Foreign Application Priority Data

Jan. 11, 1991 [JP] Japan ............................. 3-2273
Feb. 28, 1991 [JP] Japan ............................. 3-34589

[51] Int. Cl.⁵ .......................................... B01D 24/46
[52] U.S. Cl. ............................... 210/195.1; 210/168; 210/258; 210/259; 210/269; 422/24; 422/186.3
[58] Field of Search ............ 210/411, 192, 193, 195.1, 210/258, 259, 252, 269, 420, 806, 663, 669, 167, 164, 194; 422/24, 186.3

[56] References Cited

U.S. PATENT DOCUMENTS

| | | |
|---|---|---|
| 3,637,079 | 1/1972 | Strub . |
| 4,529,516 | 7/1985 | Nolan . |
| 4,568,463 | 2/1986 | Klein . |
| 4,927,547 | 5/1990 | Backman . |
| 4,957,625 | 9/1990 | Katoh et al. . |
| 4,959,142 | 9/1990 | Dempo . |
| 5,190,659 | 3/1991 | Wang et al. .................. 210/193 |

FOREIGN PATENT DOCUMENTS

| | | |
|---|---|---|
| 0237793 | 9/1987 | European Pat. Off. . |
| 1550646 | 12/1968 | France . |
| 2092285 | 1/1972 | France . |
| 2707471 | 8/1978 | Germany . |
| 2754488 | 6/1979 | Germany . |
| 48-2252 | 1/1973 | Japan . |
| 63-143917 | 6/1988 | Japan . |
| 63-311319 | 6/1990 | Japan . |
| 63-311320 | 6/1990 | Japan . |
| 64-126035 | 12/1990 | Japan . |
| 64-126036 | 12/1990 | Japan . |
| 480083 | 12/1969 | Switzerland . |
| 1088524 | 10/1967 | United Kingdom . |
| WO89/05184 | 6/1989 | WIPO . |

*Primary Examiner*—Robert A. Dawson
*Assistant Examiner*—David Reifsnyder
*Attorney, Agent, or Firm*—Young & Thompson

[57] ABSTRACT

The method of cleaning porous ceramic filters with a backwashing apparatus comprising an accelerating circulation path and a unit for mixing accelerated water with high-pressure air can be implemented with compact equipment to achieve efficient cleaning. The pool water purifying apparatus and system that adopt this method of cleaning porous ceramic filters comprise a filtering means that uses the ceramic filters, a disinfecting means and an adsorbing means and, optionally, an ultrafiltration means as an additional filtering means, and are capable of removing not only bacteria but also viruses so that the water purified by this apparatus and system may be as clean as potable water. Such an extremely high efficiency of water purification achieved by the apparatus and system can be maintained over a prolonged period since both the filtering and adsorption means can be cleaned by backwashing. The purifying apparatus is compact but it can be made further compact and allows for simpler installation work if the individual means of purification are integrated into a unitary assembly. The purifying system permits the water in a plurality of pools having different water temperatures to be purified efficiently with a single unit of the purifying apparatus.

6 Claims, 23 Drawing Sheets

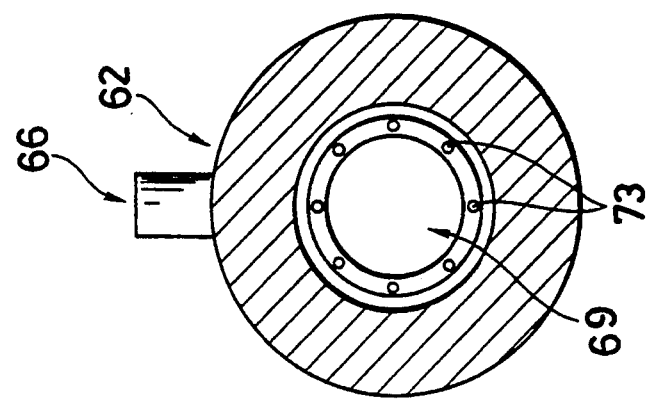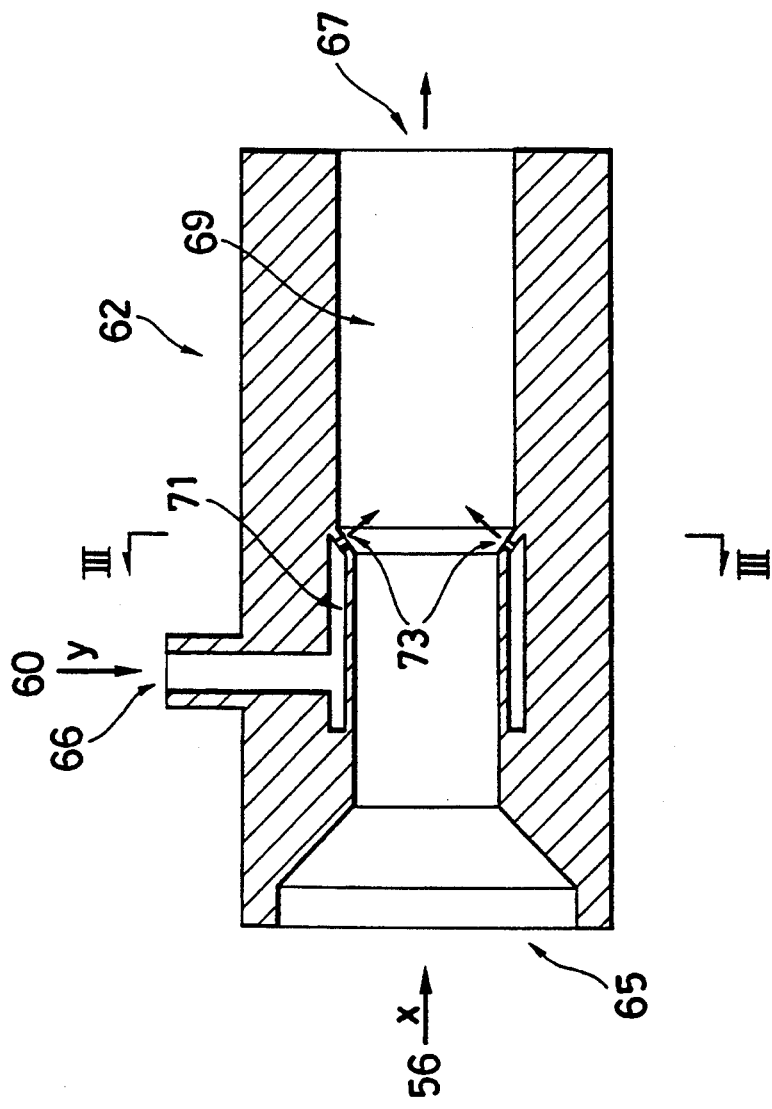

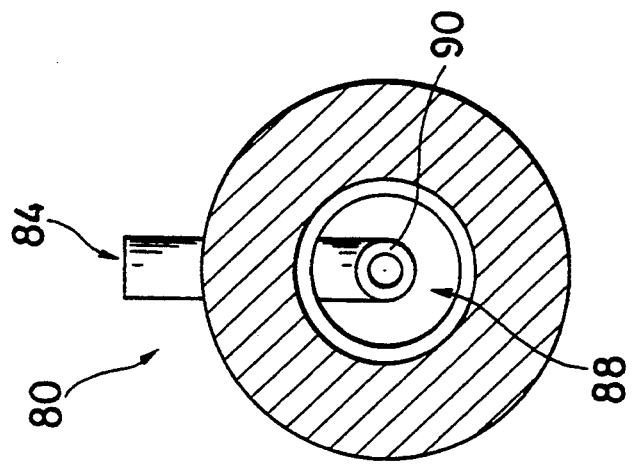
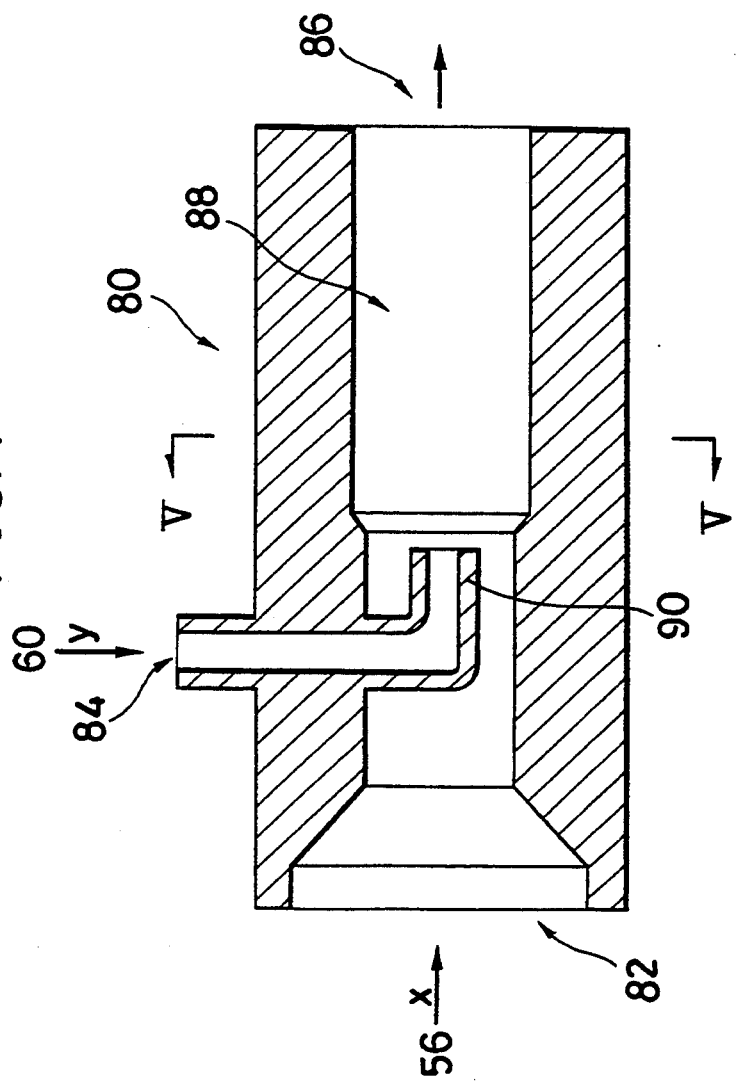

----- FILTRATION BACK WASH LINE
----- ADSORPTION TANK BACK WASH LINE

---- PRECOAT LINE

CIRCULATING FLUID PURIFICATION APPARATUS AND POOL WATER PURIFYING SYSTEM USING THE SAME

This application is a division of application Ser. No. 07/721087, filed Jun. 25, 1991 now U.S. Pat. No. 5,244,385.

BACKGROUND OF THE INVENTION

This invention relates to a method of cleaning porous ceramic filters that is applicable to filtration equipment that is capable of effectively removing organics, inorganics and other impurities from pool water and other kinds of contaminated water. The invention also relates to a circulating purification apparatus and a pool water purifying apparatus that use a circulating system which, with the aid of backwashable porous ceramic filters, is capable of effectively removing organics, inorganics and other impurities from circulating water such as pool water and other kinds of contaminated water. The invention also relates to a system of purifying pool water using those apparatus.

More particularly, this invention relates to an apparatus for purifying pool water in a circulating manner which, after being assembled in a factory, can be divided into components that can be transported on vans and other vehicles and that can be reassembled on an installation site by connecting them to a desired layout of external piping in a very simple way. The invention also relates to a pool water purifying apparatus that can be used with an ultrafiltration means to insure high performance over an extended period. The invention also relates to a pool water purifying apparatus that is an integral assembly of a porous ceramic filter, an adsorptive purifier, a disinfecting means and other purifying means, and even an ultrafiltration means and which yet is compact and can be installed by simple work. The invention further relates no a system for purifying the water in a plurality of pools including outdoor pools, indoor pools and whirlpools.

The term "pools" as used herein includes not only ordinary swimming pools but also whirlpools installed in sports clubs, Kurhaus (spa houses) and healthcare facilities, as well as various kinds of health promoting hot tubs and spas.

With the growing concern for physical fitness, many people prefer swimming as an exercise of the whole body that helps promote their health and relieve psychical stress and today an increasing part of the population, irrespective of age and sex, frequently go to swimming pools. In order for people to enjoy swimming in a safe and clean condition, pools must be kept clean, particularly in terms of water quality, and as the use of swimming pools increases, the performance requirements of purifying facilities that determine the quality of pool water are becoming increasing stringent. This is particularly true with indoor pools which are supposed to be used in all seasons because sweat, hair and other foreign matter originating from the human body are potential sources of bacterial growths that contaminate the pool water and deteriorate its quality.

Filtration equipment available today adopts various methods to purify pool water. A common method is based on the combination of filtration and disinfection with chlorine or its compounds. Recently proposed methods are disinfection with ultraviolet rays and treatments with ozone. New filter media have also been proposed as substitutes for sand and they are porous filter media exemplified by ceramic filters and activated carbon (see Japanese Patent Application (kokai) No. 143917/1988 and Japanese Patent Application Nos. 311319/1988, 311320/1988, 126035/1989 and 126036/1989).

One of the filter media that are drawing particular attention for application to facilities for purifying pool water is a porous ceramic filter. Porous ceramic filters have a three-dimensional network of extremely fine filtering spaces that are advantageous for application to pools, particularly to indoor pools, and are capable of effectively trapping organic matters such as oils excreted from the human body that have cannot be removed with existing filters.

The concept of prior art pool water filtering equipment that employs porous ceramic filters is shown in FIG. 26. A cylindrical porous ceramic filter 700 (hereunder referred to simply as "ceramic filter 700") is closed on its top with a lid 702 and fixed in the center of a hollow cylindrical housing 704.

An entrance line 708 for introducing water from a pool 706 is connected to the left side wall of the housing and an exit line 710 for recirculating filtered water to the pool 706 is connected to the center of the bottom of the housing 704. A line 712 for introducing filter aids is connected to the right side wall of the housing 704; an air vent 714 is provided on top of the housing 704; and a drain line 716 is connected to the bottom of the housing 704 in a position outside the ceramic filter 700. A back wash line 718 for cleaning the ceramic filter 700 is provided as a branch from the exit line 710.

The process of filtering the water in the pool 706 with the filtration equipment shown in FIG. 26 proceeds in the following manner. First, the air vent 714, a valve 720 on the back wash line 718 and a valve 722 on the drain line 716 are closed. Then, a valve 724 on the entrance line 708 and a valve 726 on the exit line 710 are opened and a circulating pump 728 is driven so that the water in the pool 706 circulates through a loop consisting of the entrance line 708, housing 704 and exit line 710 in that order. In short, as the water passes through the ceramic filter 700 in the direction a of a solid arrow, impurities in it are removed by filtration and clean water is returned to the pool 706.

As this process of water filtration continues, filter cake builds up on the outer surface of the ceramic filter 700 and clogs its extremely fine voids. If this condition occurs, the filter efficiency will decrease and, in an extreme case, it becomes necessary to replace the whole unit of expensive ceramic filter 700 but this means an extremely high cost since a number of filter units are usually employed.

To avoid this problem, it is necessary to clean the ceramic filter 700 periodically by removing the filter cake deposited on its outer surface. Cleaning of the ceramic filter 700 is conventionally performed by backwashing in which a "jet stream" consisting of a mixture of cleaning water and air is supplied at high speed through the back wash line 718 in such a way that the jet stream coming into the ceramic filter 700 passes through it to go outside as indicated by an unfilled arrow b.

As shown in Japanese Patent Application (kokai) No. 2252/1973, the back wash line 718 is furnished with a large air tank 729 filled with a large amount of air compressed to a comparatively high pressure and a flush tank 730 partly filled with cleaning water A to one third of its capacity. When a valve 732 provided between the two tanks is opened, the large amount of compressed air in the air tank 729 is jetted into the flush tank 730, where it is mixed with the cleaning water to produce an accelerated jet stream which is introduced into the ceramic filter 700.

The process of backwashing for cleaning the ceramic filter 700 in the apparatus shown in FIG. 26 starts with stopping the circulating pump 728, closing the valves 724 and 726 and opening the valves 720 and 722. This completes the preconditioning step. Then, the valve 732 is opened, whereupon the large amount of compressed air in the air tank 729 is jetted into the flush tank 730 and the resulting accelerated jet stream flows through the back wash line 718 in the direction of arrow to come into the ceramic filter 700 through which it passes (for backwashing) in the direction indicated by an unfilled arrow b and, after dislodging the filter cake and other deposits on the outer surface of the filter 700, the jet stream leaves the housing 704 via the drain line 716.

Since the voids in the ceramic filter 700 are extremely small, the jet stream used for backwashing is required to have a very high flow rate, namely, high cleaning pressure, in order to insure efficient cleaning of the filter. To this end, the air tank 729 must be filled with a large amount of highly compressed air but then the air tank 729 and, hence, the overall filtration equipment, becomes bulky to increase the initial investment cost.

Further, the ceramic filter 700 must be backwashed at an adequate cleaning pressure for a comparatively long period in order to insure positive cleaning of the filter.

However, as described above, the prior art backwashing apparatus forms a jet stream using the highly compressed air contained in the air tank 729 of a predetermined capacity, so the cleaning pressure drops in a very short time after it peaks (see FIG. 7). Hence, in order to maintain the necessary cleaning pressure for a desired period of time, not only a very large air tank 729 but also a high-performance system for filling with compressed air is necessary. In addition, the cleaning water must be supplied in a large volume. These result in a further increase in the equipment and running costs.

Existing apparatus for filtering pool water and industrial water are commonly equipped with many tanks including filtration tanks and disinfection tanks and fluids to be filtered such as pool water and contaminated water must be circulated through those tanks. To meet this need, a circulating system is constructed by interconnecting those many tanks via pipes. The circulating system used in existing filtration apparatus is not only used for recirculating the fluids but also equipped with a bypass line, a wash line and a backflow line that permit the interior of tanks to be washed and which, if necessary, permit the circulating fluids to bypass certain tanks or flow backward.

A prior art circulating system that has these capabilities is shown by 800 in FIG. 27 and comprises the following components: tanks 802a, 802b and 802c; an inlet pipe 804a and an outlet pipe 806a that are connected to each tank; a main pipe 808 that is directly connected to pipes 804a and 806a; switch valves 810a and 812a provided on the main pipe in two opposite positions with respect to the junction with the inlet pipe 804a; and a switch valve 814a provided on the outlet pipe 806a (those pipes and valves constitute a circulation line 816); a bypass line 818 formed of a separate bypass pipe 820; and a switch valve 822a provided on the bypass pipe 820 in positions that correspond to the respective tanks 802a, 802b and 802c in such a way that the main pipe 808 is connected to the bypass pipe 820 in two opposite positions with respect to the switch valve 822a. Because of this layout, the circulation line 816, bypass line 818 and a backflow line 824a can be selectively activated depending on the need.

Another prior art circulating system is shown by 850 in FIG. 28. A first tank 852a has an outlet pipe 856a that is fitted with a switch valve 854a and which is connected to a main pipe 862 which in turn is connected to an inlet pipe 860b that is fitted with a switch valve 858b and which is connected to a second tank 852b, whereby a circulation line 864 is formed. A bypass line 868 is formed of a separate bypass pipe 866. The circulation line 864 and the bypass line 868 are interconnected by a pipe 870a which is fitted with a switch valve 872a. The bypass pipe 866 is also fitted with a switch valve 874a in a position that corresponds to the first tank 852a. The second tank 852b is connected to a third tank 852c in the same manner as described above to form both a circulation line and a bypass line.

When these circulating systems are to be applied to a circulating filtration apparatus, it is necessary to provide not only a bypass pipe in addition to the main pipe but also the number of switch valves that permit the circulation line, bypass line and backflow line to be selectively activated increases. As a result, the number of components increases to make the layout of the overall equipment too complicated and costly to realize a compact system. Furthermore, great complexity is involved in controlling the switch valves for selectively activating the various lines.

When a new pool is to be constructed, the installation of a purifying apparatus on the site is desirably performed as simply as possible and completed within the shortest possible period so that the progress of other building operations including the construction of the pool itself will not be retarded. This is also true with the case of replacing an existing pool water purifying apparatus with a new one. Particularly in the case of indoor pools which are supposed to be used in all seasons, meeting that need is important for shortening the "closing time".

ideally, a purifying apparatus as assembled in a factory is transported to the construction site where it is installed and connected to the pool or drain facilities. In fact, however, apparatus for purifying pool water, in particular those of high performance which have an excellent purifying capability, are bulky and involve various kinds of difficulty such as the need to use large a transportation means. Further, the purifying apparatus is to be used with proper connection being made not only to the pool but also to drain and water supply facilities on the site, so various devices and pipes associated with the purifying apparatus must be fabricated to insure good match with those facilities. Therefore, in practice, it is considerably difficult to transport the pool water purifying apparatus in the same condition as it was assembled in a factory and to place it on the installation site.

Therefore, the conventional practice currently adopted is to assemble a filtration device, a disinfecting device and other individual components of the pool water purifying apparatus, transport them separately to the installation site and combine them into a complete system. However, the pool water purifying apparatus is usually installed in a fairly narrow limited place and, as already mentioned before, it comprises many components including various kinds of disinfecting and adsorbing devices and a complicated piping system is necessary to interconnect these components. Further, the use of machines and tools such as a crane and a hoist is also limited for working on the installation site. Under these circumstances the on-site operation of installing the purifying apparatus is time-consuming and difficult to accomplish.

In existing purifying apparatus, especially one that adopts filtration equipment using ceramic filters, fine particles in pool water and other kinds of water to be treated, such as organic matters with a particle size of 0.5-1 $\mu$m and above, as well as fine particulate organics including some bacterial species are removed by the filtration equipment and those bacteria which cannot be removed by the filtration equipment are disinfected with a disinfecting device, whereas malodor substances such as ammonia contained in sweat and dead bacterial cells are removed by an adsorbing device. The bacteria range approximately from 0.2 $\mu$m to 1 $\mu$m in size, so they can be effectively removed in the existing purifying apparatus by using ceramic filters and can be killed almost completely by means of the disinfecting device.

However, viruses that cause serious diseases such as AIDS, hepatitis, influenza and Japanese B encephalitis are in the form of colloidal particles ranging from 0.01 $\mu$m to 0.2 $\mu$m in size and cannot be removed even if ceramic filters are used. Needless to say, ceramic filters are totally ineffective for removing smaller particles such as protein particles with a size of ca. 0.001-0.01 $\mu$m.

With the growing concern of the public for health, the number of healthcare facilities including sports clubs, health resorts furnished with multi-purpose spas (hot tubs), Kurhaus (spa houses) and healthcare centers is increasing today. These healthcare facilities are furnished with many kinds of pools including swimming pools, Jacuzzi whirlpools such as and jet baths and various other spas and hot tubs, among which visitors can select suitable ones to meet their object. Since safety and cleanness are two absolute conditions that must be satisfied by healthcare facilities, it is necessary that the pools in those facilities be strictly checked for their cleanness, particularly the quality of pool water. To meet this need, the performance requirements of purifying facilities that determine the quality of pool water are becoming increasingly stringent and modern versions are designed to have better performance in a correspondingly large size.

A pool water purifying apparatus is an expensive system that is generally composed of filtration equipment that removes various impurities such as dust and hair contained in pool water, adsorptive purifying equipment that removes oils and other fine impurities, disinfecting equipment that disinfects pool water, optional equipment that supplies filter aids to the filtration equipment, means of heating pool water (in the case of indoor pools and hot tubs), pipes that interconnect these many units of equipment, and a control unit that control these devices. A high-performance purifying apparatus is particularly expensive and large in size and its installation takes much time.

However, filters and other purifying elements used in the existing purifying apparatus are susceptible to changes in temperature and other factors and the purifying capability of the apparatus will fluctuate or deteriorate to thereby make it impossible to purify different kinds of pool water by means of a single unit of the apparatus. Under these circumstances, Kurhaus and other facilities that use many pools require a number of expensive pool water purifying apparatus admit is sometimes necessary to install as many purifying apparatus as the pools used, and this renders the investment, construction and running costs of the purifying system only exorbitant.

The situation may be better understood by the following example. Not all pools used in Kurhaus have the same water temperature. Swimming pools, even if they are indoor pools, have water temperatures of about 30° C. whereas the water in Jacuzzi is about 40° C. and hot tubs and spas have much higher water temperatures. However, the performance of existing purifying apparatus varies with the temperature of water and no single unit of purifying apparatus is capable of keeping a plurality of pools in a uniformly clean condition. Further, depending on size, the performance of existing purifying apparatus is such that it is difficult to purity the water in a plurality of pools and keep them clean. Therefore, more than one unit of purifying apparatus is necessary to cope with different water temperatures and, as a result, the overall cost of the purifying system and its running cost become exorbitant.

BRIEF SUMMARY OF THE INVENTION

The present invention has been accomplished under these circumstances and has as a first object providing a method of cleaning porous ceramic filters that are used in fluid filtration equipment, particularly one that is assembled in an apparatus for purifying pool water, which method can be implemented with inexpensive and small equipment and allows the porous ceramic filters to be cleaned by backwashing in a reliable and effective manner.

Another object of the present invention is to provide compact circulating filtration equipment that uses porous ceramic filters and that incorporates a circulation system that is compact, less costly and of a simple construction with fewer pipes and switch valves used and that permits easy control in selecting among various flow lines, as well as simple, compact and low-cost circulating filtration equipment that incorporates said circulation system in such a way that the same piping can be used to provide many various flow lines, such as a circulation line that is composed of a filtration tank, a disinfecting tank, an adsorption tank and many interconnecting pipes, a drain line, a back wash line, and optionally a precoat line and an adsorption tank washing line, plus a circulating purification apparatus and a pool water purifying apparatus that provide easy control in selecting among those flow lines.

A further object of the present invention is to provide a pool water purifying apparatus that uses porous ceramic filters and which is characterized in that most of the apparatus can be completely assembled in a factory, that it can be easily constructed in a complete form on the installation site, with it being easily connected to the pool and water supply and drain facilities on the site.

Still another object of the present invention is to provide a pool water purifying system which additionally uses an ultrafiltration means to remove not only viruses that cause serious diseases such as AIDS and hepatitis and which cannot be completely removed by porous ceramic filters but also even smaller colloid particles such as protein particles, whereas the inorganic salts that are necessary for pool water are left intact to supply pool water that is always clean and harmless to humans.

Yet another object of the present invention is to provide a pool water purifying apparatus that has as an integral part at least one means necessary for purifying pool water that is selected from among a filtration means, a disinfection means and an adsorptive purifying means, and optionally an ultrafiltration means so as to insure advantageously the capabilities required for the purification of pool water as exemplified by the removal of impurities from pool water, its disinfection and, optionally the removal of viruses and protein particles, and which yet is very compact, small in size and can be installed in an easy manner.

A further object of the present invention is to provide a pool water purifying system that uses both a purifying apparatus equipped with porous ceramic filters and pre-filtration units which are provided for different pools, which system is characterized in that many kinds of pools having different water temperatures can always be kept clean by a single unit of the purifying apparatus so that the equipment and running costs of the system can be significantly reduced while providing ease of its installation.

In order to attain the first object described above, a first aspect of the present invention provides a method of cleaning cylindrical porous ceramic filters in a filtration unit that removes impurities from a fluid by circulating said fluid in such a way that it masses through the side wall of each of said porous ceramic filters inwardly, which method uses a means of supplying a cleaning fluid, a path for circulating said cleaning path that includes said supply means and that accelerates said cleaning fluid, a means of supplying high-pressure air, and a mixing means that is provided downstream said circulation path and that jets said high-pressure air to mix with said cleaning fluid that has been accelerated in said circulation path, whereby a high-speed two-phase stream is generated, said porous ceramic filters being cleaned by supplying said high-speed two-phase stream which is a mixture of said high-pressure air and the cleaning fluid in such a way that said stream passes through the side wall of each of said porous ceramic filters outwardly.

Preferably, said mixing means generates said two-phase stream by jetting said high-pressure air radially inwardly of the flow of said cleaning fluid.

Preferably, said mixing means generates said two-phase stream by jetting said high-pressure into the flow of said cleaning fluid in a direction parallel to said flow of the cleaning fluid.

Preferably, said mixing means is supplied with high-pressure air that is a two-phase stream prepared by preliminary mixing of the cleaning fluid with air.

in order to attain the objects described above, a second aspect of the present invention provides a circulating purification apparatus comprising:
a filtration tank that uses porous ceramic filters and that is equipped with a means of backwashing said ceramic filters: a disinfecting tank, an adsorption tank, a main pipeline through which a circulating fluid flows and which is connected to each of said tanks, an inlet pipe and an outlet pipe that are connected to each of said tanks, a switch valve provided on each of said inlet and outlet pipes, a switch valve provided on said main pipeline between the junctions of said inlet and outlet pipes no each of said tanks, a source of the circulating fluid which is connected to the entrance and exit ends of said main pipeline, and a pump connected to said main pipeline.

Preferably, said source of circulating fluid is a pool and said circulating fluid is pool water.

Another embodiment of the second aspect provides a system for purifying pool water using the circulating purification apparatus of the second aspect, which system has said pool, said pump, said filtration tank, said disinfecting tank and said adsorption tank arranged in that order to form a circulation line, said system further including a drain line fitted with a switch valve that is a branch from said circulation line, as well as a back wash line comprising a mixing unit for producing a water stream as a mixture with high-pressure air for cleaning the filters in said filtration tank, said mixing unit having an inlet branch pipe fitted with a switch valve that is connected between said pump and said filtration tank and an outlet branch pipe fitted with a switch valve that is connected to the outlet pipe from said filtration tank, and a drain pipe fitted with a switch valve that is connected to the inlet pipe to said filtration tank.

Preferably, a system of the above embodiment further includes a precoat line having a precoating tank fitted with a switch valve that forms the circulation path together with said pump and said filtration tank and an adsorption tank cleaning line that performs backwashing from the exit to the entrance side of said adsorption tank, the switch valves for effecting shifting among said circulation line, said drain line, said back wash line, said precoat line and said adsorption tank cleaning line being formed of solenoid valves, said system further including a control unit for selectively opening or closing said solenoid valves in association with either one of said lines.

A third aspect of the present invention provides an apparatus for purifying pool water in a circulating manner which comprises a platform, a means of filtering pool water using porous ceramic filters that is fixed in a predetermined position on said platform, an adsorbing means, a disinfecting means, a means of backwashing said porous ceramic filters, a circulating means, and means of providing connections to an external path of flowing water, said platform being splittable into at least two segments, and the joining portions of said connecting means being rotatable in a horizontal plane to be set in a desired position.

Preferably, said means of filtering pool water having porous ceramic filters for removing fine impurities, profilters that are provided upstream of said ceramic filters in the path of pool water circulation, and a unit for supplying said ceramic filters with a filter aid.

Preferably, said disinfecting pool water by the combination of ozone and ultraviolet radiation.

Preferably, said backwashing means has a mixing means that generates a high-speed two-phase stream by jetting high-pressure air into a cleaning fluid accelerated by a circulation line.

Preferably, the above apparatus has a heat exchanger for heating the circulating pool water.

A forth aspect of the present invention provides a system for purifying pool water that comprises:
a means of filtering the pool water using a porous ceramic filter, an ultrafiltration means that performs enhanced filtration on the pool water that has been filtered with said ceramic filter, a disinfecting means that disinfects the pool water that has been filtered by said ultrafiltration means, an adsorbing means that purifies the disinfected pool water by adsorption, and a circulating means that interconnects said means to provide a path for circulating the pool water.

Preferably, said filtering means is adapted to backwash said ceramic filter with a high-speed two-phase stream that is created by mixing high-pressure air with water that has been accelerated by the circulation path.

Preferably, said ultrafiltration means has a backwashing means, said backwashing means has a back wash line of its own, and said back washing means has an ultrasonic cleaner.

A fifth aspect of the present invention provides an apparatus for purifying pool water that comprises a cylindrical porous ceramic filter having either an adsorbing means or a disinfecting means or both accommodated therein as an integral part.

Preferably, said cylindrical filter is a porous ceramic filter.

Preferably, said porous ceramic filter is adapted to be backwashed with a high-speed two-phase stream that is produced by jetting high-pressure air into water that has been accelerated by a path of pool water circulation.

Preferably, said cylindrical filter also has an ultrafiltration means accommodated therein.

Preferably, said ultrafiltration means has a backwashing means and a back wash line of its own, and said backwashing means has an ultrasonic cleaner.

Preferably, said ultrasonic cleaner comprises an ultrasonic wave generator and a means by which the ultrasonic wave emitted from said ultrasonic wave generator is reflected toward said ultrafiltration means.

Preferably, said adsorbing means uses at least activated carbon and said disinfecting means uses both ozone and ultraviolet radiation.

Preferably, said cylindrical porous ceramic filter, said ultrafiltration means, said adsorbing means and said disinfecting means are arranged, in that order, from the periphery toward the center.

A sixth aspect of the present invention provides a system for purifying the water in a plurality of pools having different water temperatures, which system has both a purifying apparatus that includes a filtering means using porous ceramic filters and that is connected to at least two of said pools and a prefiltration unit that is provided for each of said pools, the water in each of said pools being purified in ordinary, situations by means of the prefiltration units provided for the respective pools but, as time passes by and/or if the water in a certain pool becomes excessively dirty, the operation of the prefiltration unit associated with that pool s shifted to the purifying apparatus, which then purifies the water in that pool.

Preferably, said purifying apparatus additionally includes an adsorbing means, a disinfecting means and a circulating means, said purifying apparatus also includes an ultrafiltration means, said ultrafiltration means has a backwashing means, and said backwashing means is an ultrasonic cleaner.

Preferably, each of said prefiltration units comprises an overflow tank that provides a temporary storage for the water overflowing the associated pool and that is divided into at least two vessels by a partition suspended from above, a filter for filtering the pool water stored in the most downstream vessel of said overflow tank, and a means of circulating the pool water.

Preferably, the switching from said prefiltration units to said purifying apparatus is sequence-controlled automatically in accordance with a preset program, except that when the water in a certain pool becomes very dirty, the system leaves the sequence control and allows said purifying apparatus to purify the water in that pool in preference over the other pools and returns to said sequence control after the purification of the excessively dirty water in that particular pool with said purification apparatus has ended.

BRIEF DESCRIPTION OF THE DRAWINGS

FIGS. 2 and 3 are schematic sectional views showing an example of the mixing unit used in the filtration system shown in FIG. 1;

FIGS. 4 and 5 are schematic sectional views showing another example of the mixing unit used in the filtration system shown in FIG. 1;

DETAILED DESCRIPTION OF THE INVENTION

The present invention is described below in detail with reference to the preferred embodiments shown in accompanying drawings.

To begin with, the method of cleaning porous ceramic filters which is the first aspect of the present invention is described specifically with reference to FIGS. 1–7.

Figure 1:
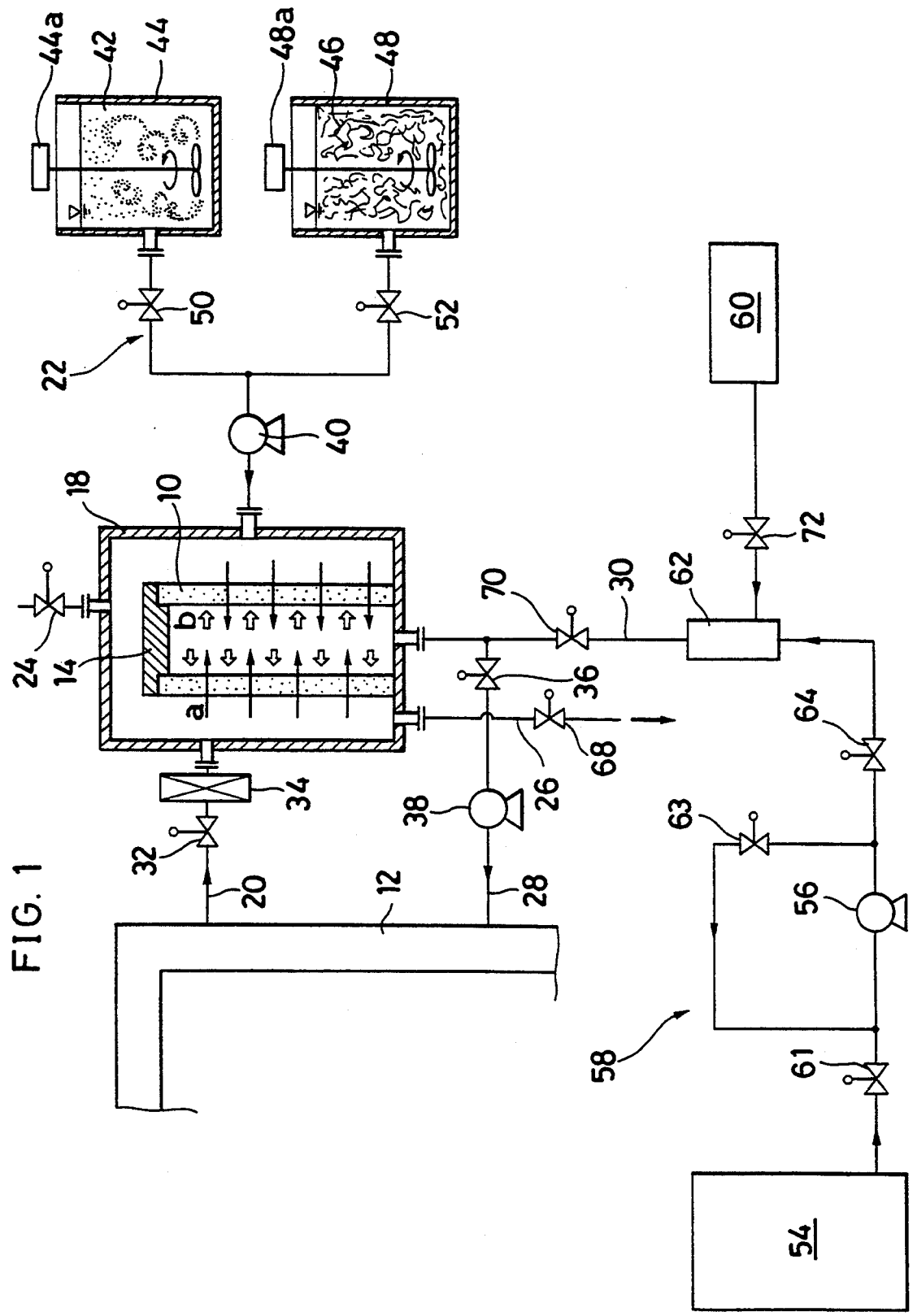
FIG. 1 is a diagram that shows the concept of a system for filtering pool water using the method of the present invention for cleaning porous ceramic filters.
Figure 6:
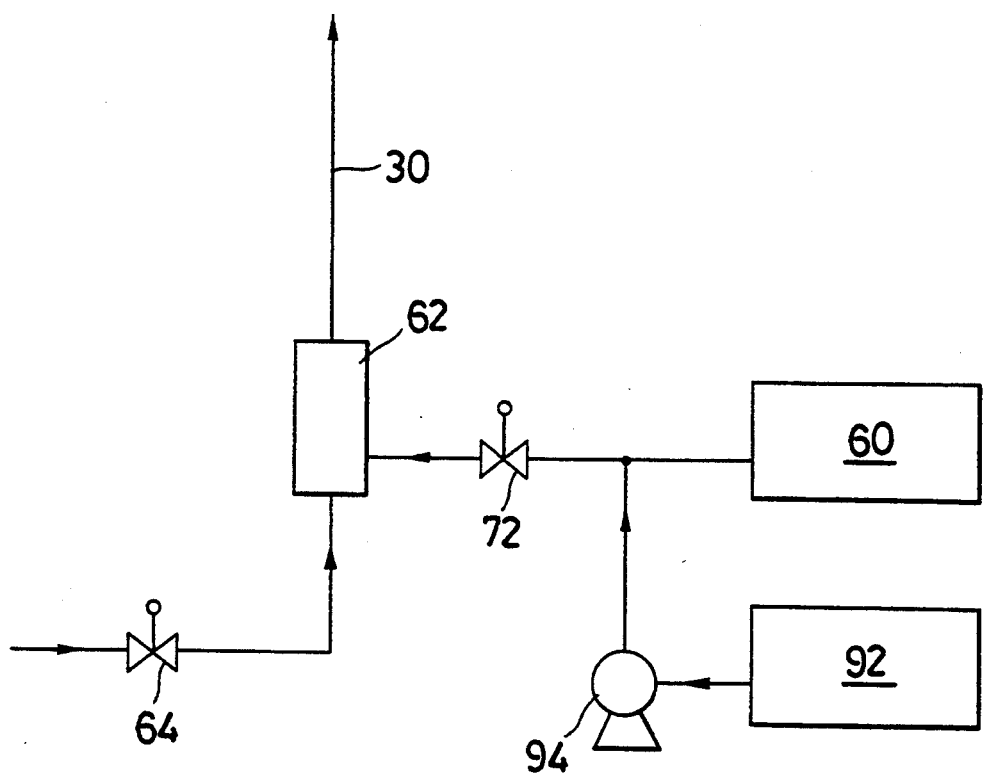
FIG. 6 is a diagram that shows the concept of a modification of the air supply means in a system for filtering pool water using the method of the present invention for cleaning porous ceramic filters.
Figure 7:
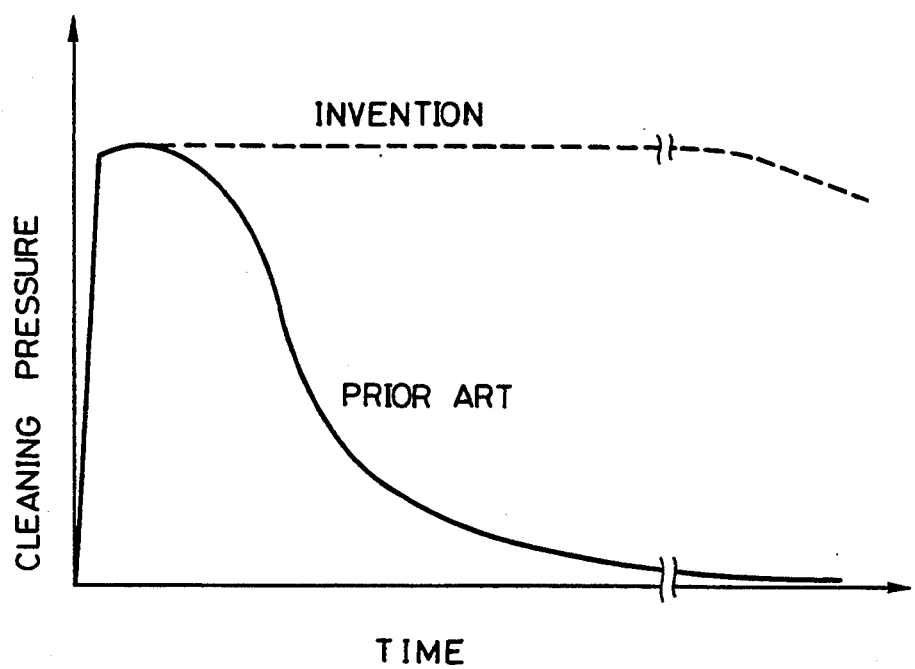
FIG. 7 is a graph showing the washing pressure vs time profile of the method of the present invention for cleaning porous ceramic filters as compared with a prior art method.

FIG. 1 shows the concept of a system for filtering pool water using the method of the present invention for cleaning porous ceramic filters (which is hereinafter referred to simply as the "cleansing method"). In the filtration system shown in FIG. 1, the water in a pool 12 (the term "water" as used herein without any qualifier shall refer to the pool water which is to be filtered) is supplied around a porous ceramic filter 10 (which is hereinafter referred to simply as "ceramic filter") and passes through the side wall of the ceramic filter inwardly, whereby the water is filtered to become clean.

The ceramic filter 10 which has a cylindrical shape is closed on its top with a lid 14 and fixed to the center of the bottom of a hollow cylindrical housing (tank) 18.

In the filtration system shown in FIG. 1, an entrance line 20 for introducing water from a pool 12 is connected to the left side wall of the tank housing 18; a precoating unit 22 for supplying filter aids is connected to the right side of the housing 18; an air vent 24 is provided on top of the housing 18; a drain line 26, an exit line 28 for recirculating filtered water no the pool 12, and a back wash line 30 are connected to the bottom of the housing 18. The back wash line 30 is a branch from the exit line 28 and used to backwash the ceramic filter 10 by the cleaning method of the present invention.

The entrance line 20 is fitted with a valve 32 and a prefilter 34 and connects part of the pool 20 to the housing 18. The prefilter 34 rejects dust and other large particulate matter from the water before it is filtered with ceramic filter 10.

The exit line 28 is fitted with a valve 36 and a circulating pump 38 which is a drive source for circulating the water. The exit line 28 connect s the pool 12 to the center of the bottom of the housing 18, or the area which corresponds to the interior of the cylindrical ceramic filter 10.

Constructed in this way, the filtration system shown FIG. 1 has the water circulated by the pump 38 through the closed loop consisting of the pool 12, entrance line 20, housing 18 (ceramic filter 10), exit line 28 and pool 12 in that order. As a result, the water entering the housing 18 is filtered by passing through the side wall of ceramic filter 10 inwardly in the direction of a solid arrow a.

FIG. 1 shows a preferred embodiment of the filtration system in which it is equipped with the filter aid supply unit 22. The unit 22 supplies the housing 18 with two filter aids, one being in a powder form and the other in a fibrous form. The unit 22 comprises a slurry pump 40 capable of feeding fluids in a slurry form, a tank 44 filled with a mixture 42 of water and a powder filter aid such as diatomaceous earth or lime, a tank 48 filled with a mixture 46 of water and a fibrous filter aid such as cellulose, pulp fibers or asbestos, and valves 50 and 52 associated with respective tanks 44 and 48. The tanks 44 and 48 are equipped with stirrers 44a and 48a, respectively, for agitating the mixtures with which they are filled.

As already mentioned, the ceramic filter 10 has a three-dimensional network of voids that are small enough to trap very small particles such as oils excreted from the human body. Hence, if the ceramic filter 10 is directly used for filtration, those fine voids may soon be clogged to cause great difficulty in the operation of filter cleaning.

Under the circumstances, it is preferred to perform filtration with the layers of the two filter aids mentioned above being formed (precoated) on the outer surface of the ceramic filter 10, the powder filter aid (e.g. diatomaceous earth and lime) forming a release layer that readily collects impurity particles in the pool water and that can be easily removed as required, and the fibrous filter aid (e.g. cellulose, pulp fibers and asbestos) forming a filtering layer over said release layer. This arrangement not only enhances the efficiency of cleaning the ceramic filter 10 but also facilitates its backwashing so that it can be used over a prolonged period, whereby the effectiveness of the cleaning method of the present invention is further improved. In order to achieve even better cleaning, a silica layer made of silica gel which is capable of removing proteins in the pool water by selective adsorption may be formed between the release layer and the filtering layer. The order of arrangement of the release layer, filtering layer and the optical silica layer is by no means critical but they may be arranged in a reverse order. The present invention is not limited to the case where only one layer is formed from each of the filter aids. If desired, an least one of the filter aids may be precoated to form multiple layers, of each of the filter aids employed may form multiple layers.

The process of forming the layers of two filter aids with the precoating unit 22 may proceed as follows. First, a filter aid of interest and water are mixed thoroughly with the associated stirrer. Them, the valve associated with the layer of filter aid to be formed is opened and the necessary amount of the resulting mixture 42 or 46 in slurry form is supplied into the housing 18 by means of the slurry pump 40. After turning off the slurry pump 40 and closing the valve, the circulating pump 38 is driven to circulate the mixture in the same manner as in filtering the water. In the example shown in FIG. 1, two separate tanks 44 and 48 are provided for the respective filter aids 42 and 46. This, however, is not the sole case of the present invention and only one precoating tank may be used in the following manner: the required amount of one filter aid is charged into that precoating tank and mixed with water; the total mixture is supplied into the tank housing 18 for a predetermined period by means of the slurry pump 49 so as to form the layer of the filter aid on the outer surface of the ceramic filter 10; this procedure is repeated as many times as are necessary for the layers of the filter aids to be formed.

By this reclusive method, a cellulose layer is first formed, then a silica gel layer, next a diatomaceous earth layer, and finally another cellulose layer is formed.

While various known products can advantageously be used as the silica gel capable of selective adsorption of proteins, a silica hydrogel may be shown as a particularly preferred example. A silica hydrogel is a polymer of $SiO_2$ molecules with a size of several millimicrons that form a three-dimensional structure having a uniform pore size and a large void volume and surface area, with silanol groups forming a network structure within and on the surfaces of the voids. Such a silica hydrogel, particularly one having pore sizes of 80–100 A, may be combined with activated carbon to provide an adsorptive purifying means that is capable of removing very small particulate matters such as proteins released from the human body. An advantageous example of the silica hydrogel is "Britesorb A-100" of Asahi Glass Co., Ltd.

The thicknesses of the release layer, filtering layer and the silica layer, as well as the amounts of filter aids that are used to make those layers are by no means critical and may be determined as appropriate depending on various factors such as the temperature of pool water, its use and the degree of fouling.

A method of filtration using the two layers of filter aids (i.e., release layer and filtering layer) is described in detail in Japanese Patent Application (kokai) No. 143917/1988.

In the filtration system shown in FIG. 1 which has the basic layout described above, the back wash line 30 with which the cleaning method of the present invention is implemented in order to remove the filter cake deposited on the side wall of the ceramic filter 10, as well as the aforementioned filter aids is provided as a branch from the exit line 28.

In the filtration system shogun in FIG. 1, the back wash line 30 forms a channel through which a "two-phase" jet stream made of water and air is propelled at high speed to clean the ceramic filter 10 by backwashing it in the direction indicated by an unfilled arrow b. The back wash line 30 is composed of a feed tank 54 filled with a cleaning fluid, a pump 56 for supplying the cleaning fluid, a circulation path 58 including the pump 56, an air supply means 60, and a mixing unit 62 in which the cleaning fluid is mixed with air to form a jet stream made of a gas and a liquid phase.

The tank 54 is filled with the cleaning fluid which is to be mixed with air to form a two-phase jet stream and this tank may be selected from among various ordinary tanks. The cleaning fluid that can be used in the cleaning method of the present invention is not limited to any particular type and various kinds of cleaning fluids may be employed depending on the object of using the filtration system of interest (e.g. whether it is used to purify pool water or other kinds of water), with illustrative examples being ordinary water, tap water and water containing small amounts of detergents such as alkalies having a cleaning capability.

The circulation path 58 includes the pump 56 and is a closed loop through which the cleaning fluid can be circulated by a process consisting of supplying a predetermined amount of the cleaning fluid from the tank 54, closing valves 61 and 64 while opening a valve 63, and then driving the pump 56.

As already described in connection with the prior art, the ceramic filter 10 is preferably backwashed with the cleaning fluid (or the jet stream) being supplied at high speed to create a high cleaning pressure. Since the cleaning method of the present invention uses the circulation path 58 to circulate the cleaning fluid before the cleaning operation is started, the pump 56 can be brought to a complete start-up condition so that it is operated to its maximum capacity during the backwashing of the ceramic filter 10.

The air supply means 60 supplies the mixing unit 62 with air which is to be mixed with the cleaning fluid to form a jet stream. The air supply means 60 that can be used in the present invention is not limited to any particular type and may be selected from among various types of air supply means, preferably high-pressure air supply means, as exemplified by air compressors arid air containers that are capable of supplying the mixing unit 62 with the necessary and sufficient amount and pressure of air. For insuring that high-pressure air can be supplied in a consistent manner, the air supply means 60 may be equipped with a reserve tank that can be filled with highly compressed air.

in the mixing unit 62, the cleaning fluid and air supplied in the way described above are mixed to form a jet stream.

FIG. 2 shows schematically a section of the mixing unit 62 as taken in the direction in which the cleaning fluid travels, and FIG. 3 shows schematically a section of the same unit as taken in a direction normal to the travel of the cleaning fluid (on line III—III).

As shown, the mixing unit 62 is cylindrical in shape and has an inlet 65 for the cleaning fluid, an air inlet 66, and an outlet 67 through which the jet stream formed of the cleaning fluid and air is ejected.

The cleaning fluid supplied by means of the pump 56 is admitted into the mixing unit 62 through the inlet 65 and travels through a through-hole 69 in the direction of arrow x. At the same time, the high-pressure air fed by the air supply means 60 is admitted through the inlet 66 as indicated by arrow y, passes through an annular space 71 around the through-hole 69, and is ejected into the latter in the direction of arrow via eight nozzles 73 that surround the through-hole.

Thus, in the mixing unit 62 shown in FIGS. 2 and 3, the high-pressure air mixes with the cleaning fluid by being jetted in the latter from around the through-hole 69 in an area near the middle portion of said hole in the direction of arrow x. As a result, a jet stream composed of a liquid and a gas phase is formed and leaves the outlet 67 to be propelled into the housing 18.

The direction in which the high-pressure air is ejected into the through-hole 69 is not limited to the case shown in FIG. 2 but it may be applied in various other directions. It should, however, be noted that for the reason already described above (the flow rate and cleaning pressure of the jet stream should be high in order to achieve satisfactory cleaning), the high-pressure air is preferably applied in a direction that will not impede the travel of the cleaning fluid, or in a direction substantially parallel to the direction of arrow x. For the same reason, the high-pressure air, if it is applied in a direction substantially parallel to the direction of arrow x, is preferably propelled at a sufficient pressure to accelerate the speed of the cleaning fluid.

FIG. 4 shows another example of the mixing unit that can be used in the present invention and FIG. 5 is a cross section of FIG. 4 taken on line V—V.

in the mixing unit 62 shown in FIG. 2, the high-pressure air is propelled into the through-hole 69 in the circumferential direction, namely, from the periphery of the flow of the cleaning fluid. In the mixing unit shown by 80 in FIG. 4, a jet stream is formed by propelling the high-pressure air into the cleaning fluid in the same direction as it flows.

The mixing unit 80 shown in FIG. 4 is essentially the same as the mixing unit 62 in that it is cylindrical in shape and has an inlet 82 for the cleaning fluid, an air inlet 84, and an outlet 84 through which the jet stream formed of the cleaning fluid and air is ejected.

The cleaning fluid supplied by means of the pump 56 is admitted into the mixing unit 80 via the inlet 82 and travels through a through-hole 88 in the direction of arrow x. At the same time, high-pressure air fed by the air supply means 60 is admitted via the inlet 84 as indicated by arrow y and propelled into the through-hole 88 by way of a nozzle 90 the center line of which aligns with that of the through-hole 88, or which permits the high-pressure air to travel along the center line of the flow of the cleaning fluid in the same direction as it travels. The jet stream formed by this mixing of the high-pressure air and the cleaning fluid leaves the outlet 86 to be supplied into the housing 18.

As in the case of the mixing unit 62, in order to enhance the cleaning efficiency, air to be propelled into the through-hole 88 in the mixing unit 80 is preferably applied at a sufficient pressure to accelerate the speed of the cleaning fluid.

The means of mixing the cleaning fluid with air that can be used in the present invention is in no way limited to the mixing units 62 and 80 and various known gas-liquid mixing means may be employed without any particular limitations.

According to the cleaning method of the present invention which has the basic features described above, the cleaning fluid supplied by the pump 56 which is adapted to operate at maximum capacity and the high-pressure air fed by the air supply means 60 are mixed in the mixing unit 62 to form a jet stream. As a result, the jet stream having the adequate cleaning pressure indicated by a dashed line in FIG. 7 can be continuously supplied and the ceramic filter 10 can be cleaned in an efficient and positive manner without using large or many air tanks or cleaning fluid tanks that have been necessary in the prior art to insure the filling of high-pressure air and cleaning fluid in large volumes. To state conversely, the cleaning fluid and high-pressure air need be supplied in smaller amounts and this contributes to a substantial reduction in the running cost of the filtration system.

In the examples described above, the cleaning fluid fed by the pump 56 is mixed only with high-pressure air in the mixing unit 62 (or 80). However, this is not the sole case of the present invention and the example shown in FIG. 6 may be adopted. As shown, the air supply means 60 is used in combination with a second tank 92 for supplying the cleaning fluid and a high-pressure pump 94; the high-pressure air supplied from the air supply means 60 is mixed with the cleaning fluid fed by the high-pressure pump 94 and the resulting two-phase jet stream which is a premix of the air and cleaning fluid is injected into the mixing unit 62 where it is mixed with the cleaning fluid fed by the pump 56.

The process of cleaning the ceramic filter 10 by back-washing through the back wash line 30 shown in FIG. 1 may proceed as follows. First, the valve 64 is closed whereas the valves 61 and 63 are opened and, then, the pump 56 is driven to have the cleaning fluid circulate through the circulation path 58. If the circulation path 58 is supplied with an adequate amount of the cleaning fluid, the valve 61 may be closed. In the meantime, the valves 32 and 36 and air vent 24 are closed whereas the valve 68 on the drain line 26 are opened.

Subsequently, checking is made as to whether the cleaning fluid is circulating through the circulation path 58 with the pump 56 operating at its maximum capacity. If the result is positive, a valve 70 positioned downstream of the mixing unit 62 is opened to open the back wash line 30. Then, valves 61 and 64 are opened, valve 63 is closed and valve 72 associated with the air supply means 60 is opened, whereupon high-pressure air is supplied into the mixing unit 62 where it is mixed with the cleaning fluid to form a jet stream, which is injected into the ceramic filter 10.

The jet stream entering the ceramic filter 10 passes through its side wall outwardly as indicated by an unfilled arrow b, dislodges filter cake and other deposits on the outer surface of the ceramic filter 10 and is subsequently discharged from the housing 18 together with the dislodged matter through the drain line 26.

While the method of the present invention for cleaning porous ceramic filters has been described above in detail, it should be noted that the invention is in no way limited to the particular embodiments described hereinabove but that various modifications and improvements can be made without departing from the scope and spirit of the present invention.

As described on the foregoing pages, in accordance with the first aspect of the present invention, there is provided a method of cleaning porous ceramic filters in fluid filtration equipment, which method can be implemented with inexpensive and small equipment and allows the porous ceramic filters to be cleaned by backwashing in a reliable and effective manner. Using this method, the overall cost of a system for filtering pool wager and other bodies of water that are contaminated with fine particulate matters, particularly with organics and inorganics, can be markedly reduced. In addition, the amounts of cleaning fluid and high-pressure air that are necessary to form a backwashing jet stream are much smaller than in the prior art filtration systems and, hence, the running cost of the system can be substantially reduced.

In its second aspect, the present invention relates to a circulating purification apparatus that uses the above-described method of cleaning porous ceramic filters and a system for purifying pool water employing that apparatus, as described below in detail with reference to FIGS. 8-11.

The circulation system used in the circulating purifying apparatus of the present invention has a main pipe connected to two pipes that are connected to one tank and each of which is fitted with a switch valve, and the main pipe has a switch valve fitted in the area between the junctions with said two pipes connected to the tank. This piping configuration is provided for each of the many tanks incorporated in the circulation system. If the switch valves fitted on the main pipeline are closed whereas the switch valves on all pipes connected to the tanks are opened, the main pipeline can be used as a circulation line. If, on the other hand, the switch valves on the main pipeline are opened whereas the switch valves on all pipes connected to the tanks are closed, the main pipeline can be used as a bypass line. If the main pipeline is to be used as a back wash line, the jet stream may be permitted to circulate only through the tank that needs backwashing while the other tanks are bypassed.

The circulating purification apparatus and pool water purifying system of the present invention have a filtration tank (which adopts the above-described method of cleaning porous ceramic filters), a disinfecting tank and an adsorption tank integrated into the above-described circulation system, with the main pipeline being connected to the source of a circulating fluid to provide a circulation line and having a circulating pump halfway the path of said pipeline. If the source of a circulating fluid is a pool, not only the circulation line and bypass line (i.e., drain line) are used; buy also these lines are partly used to provide, as required, a back wash line, a precoat line and a line for washing the adsorption tank, and solenoid valves fitted on those lines are selectively opened or closed by the control unit to insure that the individual lines are selectively activated.

Having these features, the circulating purification apparatus of the present invention and the system of purifying pool water using this apparatus are simple in construction, compact and less costly and provides ease in controlling the selective operation of the associated lines.

The second aspect of the present invention, i.e., a circulating purification apparatus and a system for purifying pool water using that apparatus, is described below in detail with reference to the preferred embodiments shown in FIGS. 8–11.

Figure 8:
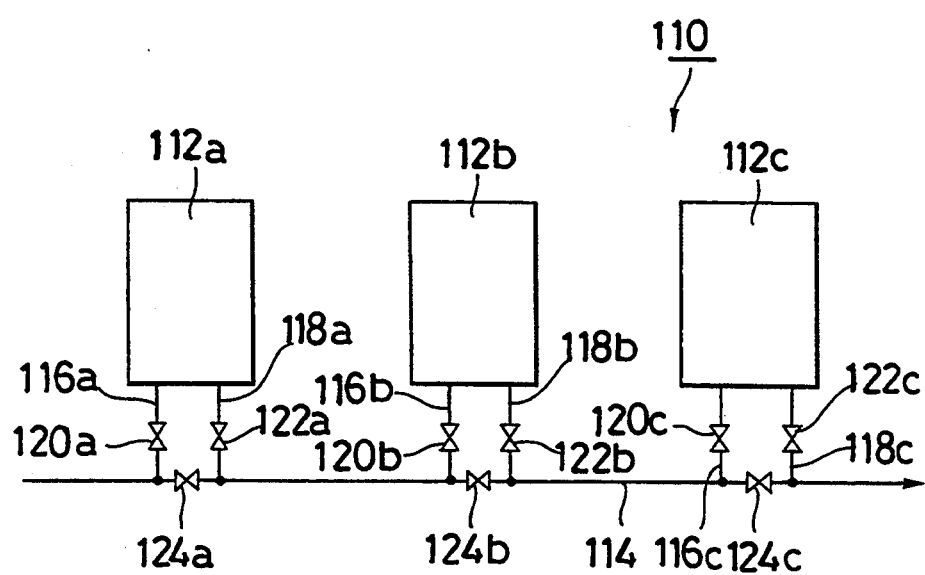
FIG. 8 is a block diagram showing an embodiment of the circulation system used in the present invention.

FIG. 8 is a block diagram showing an embodiment of the circulation system used in the present invention;

As shown, the circulation system generally indicated by 110 which is used in the present invention comprises the following components: three tanks 112a, 112b and 112c (in the case under consideration, three tanks are assumed but this is just intended to be a typical example and more tanks may be used if necessary); a main pipe 114; an inlet pipe 116a and an outlet pipe 118a by which tank 112a is connected to the main pipe 114; an inlet pipe 116b and an outlet pipe 118b by which tank 112b is connected to the main pipe 114; an inlet pipe 116c and an outlet pipe 118c by which tank 112c is connected to the main pipe 114; switch valves 120a, 120b, 120c, 122a, 122b and 122c that are fitted on pipes 116a, 116b, 116c, 118a, 118b and 118c, respectively; a switch valve 124a fitted on the main pipe 114 between the junctions to the pipes 116a and 118a; a switch valve 124b fitted on the main pipe 114 between the junctions to the pipes 116b and 118b; and a switch valve 124c fitted on the main pipe 114 between the junctions to the pipes 116c and 118c.

If it is necessary to circulate a fluid through all tanks 112a, 112b and 112c in the circulation system 110, switch valves 124a, 124b and 124c are closed whereas all switch valves on the pipes connected to the tanks, that is, switch valves 116a, 116b, 116c, 118a, 118b and 118c, are opened. By so doing, a circulation line is established and the fluid can be circulated through the tanks. If one wants to bypass all tanks 112a, 112b and 112c, switch valves 116a, 116b, 116c, 118a, 118b and 118c are closed whereas switch valves 124a, 124b and 124c are opened, whereby the main pipe 114 itself is established as a bypass line through which the fluid flows, bypassing the tanks.

Needless to say, a line may be established in such a way that the fluid flows through only one of the three tanks, bypassing the other two tanks. If one wants to have the fluid flow through only tank 112a, he may open switch valves 116a, 118a, 124b and 124c and close all other switch valves. If the fluid flow is reversed, the fluid is permitted flow backward only through tank 112a.

Figure 27:
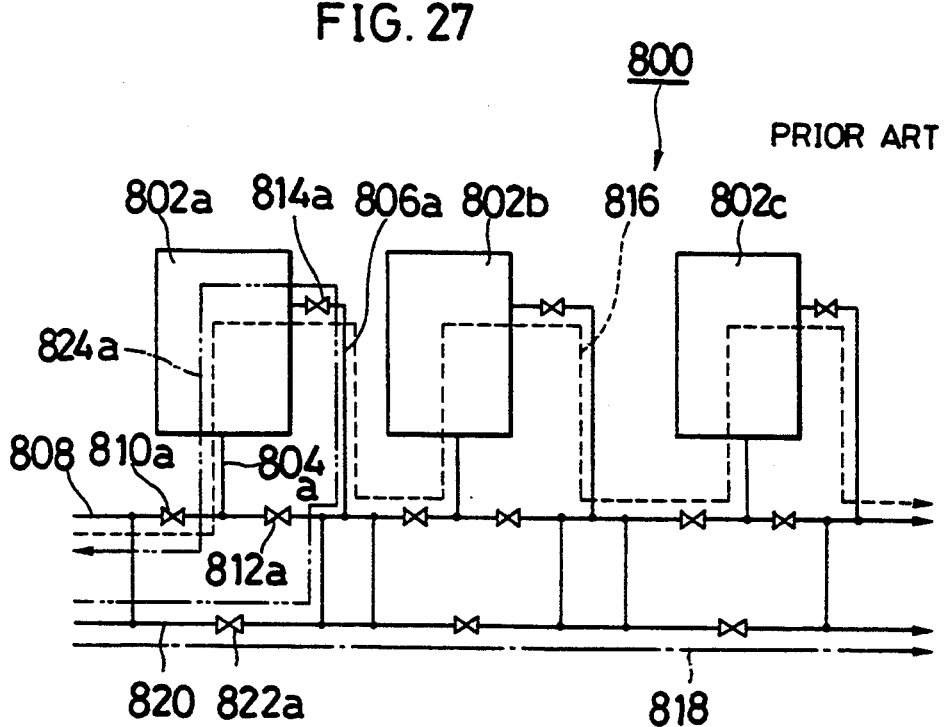
FIGS. 27 and 28 are block diagrams of the circulation systems used in prior art circulating filtration equipment.
Figure 28:
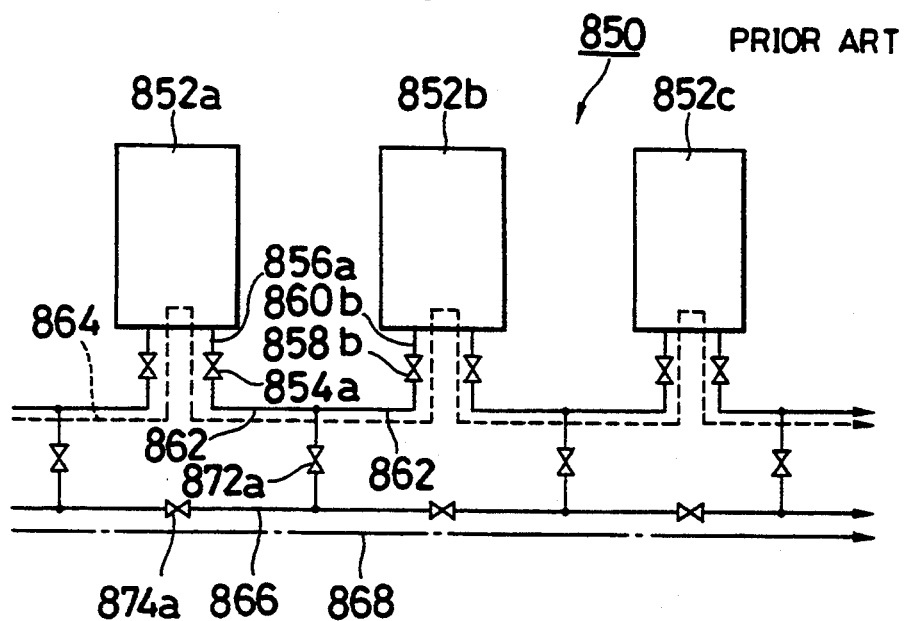

The circulation system 110 having the layout described above has the following advantages over the prior art circulation systems shown in FIGS. 27 and 28: there is no need to provide a bypass pipes or pipes that connect the bypass pipe to the main pipe; the number of switch valves that must be fitted for one tank is reduced from 4 to 3; as a result, the layout of the circulation system shown in FIG. 8 is simple, compact and less costly.

The apparatus of the present invention for purifying pool water using the above-described circulation system is described below in detail with reference to FIGS. 9–11.

Figure 9:
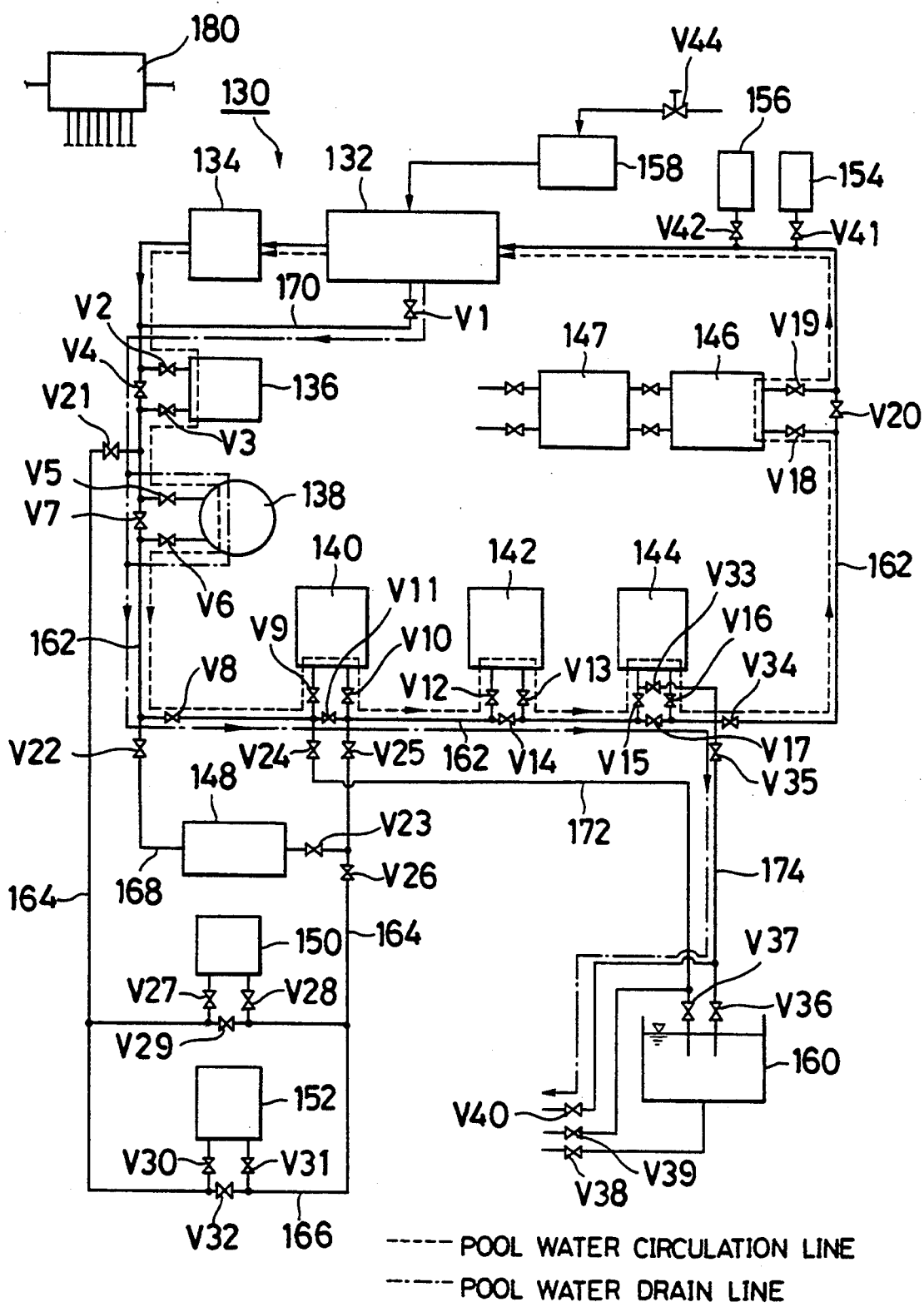
FIG. 9, 10 and 11 are block diagrams showing different application examples of an embodiment of the pool water purifying system of the present invention.
Figure 10:
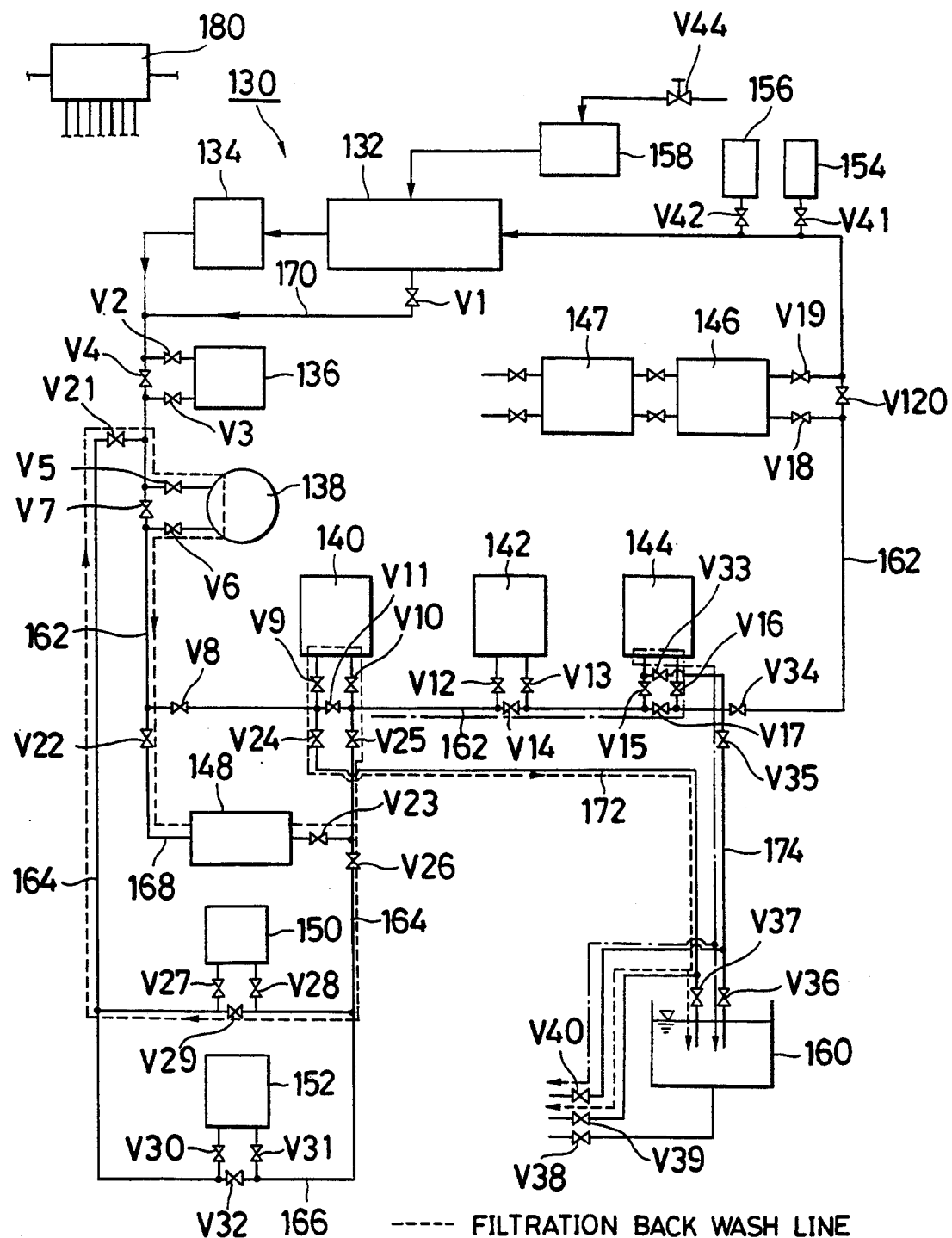

FIG. 9 is a block diagram showing the fluid channels in an embodiment of the pool water purifying system that uses the circulating purification apparatus of the present invention.

The pool water purifying system generally indicated by 130 in FIG. 9 has the following components: an overflow tank 134, a prefilter tank 136, a pump 138, a filtration tank 140, a disinfecting tank 142, an adsorption tank 144 and a heat exchanger 146 that are arranged in that order along the circulation path starting with a pool 132; a mixing unit 148 that is provided parallel to the filtration tank 140 and that generates a stream of high-pressure air containing cleaning fluid for use as a backwashing medium; precoating tanks 150 and 152 that are provided parallel to the pump 138 and filtration tank 140; an alkali tank 154 and a chlorine tank 156 that are connected to the pipe between the heat exchanger 146 and the pool 132; a balancing tank 158 for storing the make-up water to be added to the pool 132; a sedimentation tank 160 for causing the precipitation of solids in drained pool water, drained backwashing fluid from the filtration tank and drained washings from the adsorption tank; a circulation pipe 162, precoat branch pipes 164 and 166, a back wash pipe 168 drain pipes 170, 172 and 174 and many other pipes, all of which pipes interconnect the above-mentioned tanks to establish various lines through which the pool water flows; a number of switch valves V1–V44 that are fitted on those pipes; and a control unit 180 that controls those switch valves in such a way they are selectively opened or closed in accordance with the specific line to be established.

The overflow tank 134 provides a temporary storage of the pool water overflowing the pool 132, water drained under gravity, or pool water that has been drained by a pump or some other means. This overflow tank 134 is connected to the circulation pipe 162 and drains a predetermined amount of pool water into that pipe. Drain pipe 170 extends from the bottom of the pool 132 and permits pool water to be drained for various purposes such as cleaning the pool 132. The drain pipe 170 is connected to the circulation pipe 162 just downstream of the overflow tank 134. The drain pipe 170 is fitted with switch valve V1.

The prefilter tank 136 is packed with filter media such as carbon filters and removes hair, waste of threads or yarns, adhesive tape, dust and other coarse impurities that are contained or suspended in the drained pool water flowing out of the overflow tank 134. The prefilter tank 136 combines with the circulation pipe 162 to establish the circulation system of the present invention and is fitted with inlet valve V2, outlet valve V3 and bypass valve V4.

More than one unit of prefilter tank 136 may be used.

The pump 138 is a circulating pump and may be of any type that imparts sufficient energy to cause the pool water to flow through channels in the purification system 130. The pump 138 is fitted with inlet valve V5, outlet valve V6 and bypass valve V7. The number of units of pump 138 is variable; one pump unit may be used or, alternatively, a plurality of pump units may be connected in series or parallel to one another.

The filtration tank 140 is a means of purifying the pool water by trapping metal salts, organics such as oils and dirt, impurities and fine particles such as bacterial cells of sizes down to ca. 0.15–1 μm that are carried into or generated in the pool water. The filtration tank 140 is loaded with more than one unit, say, 100–150 units, of the porous ceramic filter already described above that is capable of trapping fine particles with sizes of down ca. 0.25–1 μm.

As already described in connection with the first aspect of the present invention, the porous ceramic filter used in the present invention has a three-dimensional network of very small voids and is capable of trapping not only fine particles such as bacterial cells but also organic matters such as oils excreted from the human body (see FIG. 1). However, if the ceramic filter is directly used in filtration, the fine pores in it will soon be clogged and its filtering capability will decrease within a short period and it becomes no longer cleanable. To avoid this problem, the ceramic filter is usually coated with readily removable layers of filter aids on the side where the fluid to be filtered flows in (see FIG. 1).

The disinfecting tank 142 is where bacteria such as *E. coil S. aureus* and viruses present in the pool water are killed, and controlled or attenuated. The tank contains an ozone lamp and an ultraviolet lamp accommodated in a transparent quartz glass tube. The filtered pool water is disinfected as it is circulated around the quartz glass tube. In addition, dry air is supplied into the quartz glass tube to generate ozone by means of the ozone lamp and the uv lamp and air containing the evolved ozone is bubbled into the pool such as oils excreted from the human body (see FIG. 1). However, if the ceramic filter is directly used in filtration, the fine pores in it will soon be clogged and its filtering capability will decrease within a short period and it becomes no longer cleanable. To avoid this problem, the ceramic filter is usually coated with readily removable layers of filter aids on the side where the fluid to be filtered flows in (see FIG. 1).

The disinfecting tank 142 is where bacteria such as *E. coil S. aureus* and viruses present in the pool water are killed, and controlled or attenuated. The tank contains an ozone lamp and an ultraviolet lamp accommodated in a transparent quartz glass tube. The filtered pool water is disinfected as it is circulated around the quartz glass tube. In addition, dry air is supplied into the quartz glass tube to generate ozone by means of the ozone lamp and the uv lamp and air containing the evolved ozone is bubbled into the pool water so as to agitate it and form small bubbles of ozone, which effectively sanitize the pool water by ozone oxidation. As will be described below, the pool water is usually disinfected with chlorine gas and the disinfection with uv rays and ozone which is performed in the tank 142 will further enhance the effectiveness of chlorine gas supplied into the pool water. It is preferred that carbon dioxide gas is mixed with dry air supplied into the quartz glass tube, so that mixed gas containing carbon dioxide and ozone can disinfect the pool water further effectively.

The adsorption tank 144 is packed with adsorbents such as zeolite and activated carbon. In this tank, ammonia resulting from human sweat and urine, bacterial cells decomposed in the disinfecting tank 142, colorants, combined chlorine and other materials that are present in the filtered and disinfected pool water are removed by the adsorbing action of the adsorbents. Any adsorbents can be used as long as they will not cause biologically harmful substances to be dissolved in the pool water and preferred examples are zeolite, activated carbon and silicagel. Zeolite is capable of selectively adsorbing ammonia whereas activated carbon is capable of selectively adsorbing odor components, colorants and combined chlorine in the pool water.

Each of the filtration tank 140, disinfecting tank 142 and adsorption tank 144 combines with the circulation pipe 162 to establish the circulation system of the present invention. The filtration tank 140 is fitted with switch valves V9, V10 and V11, the disinfecting tank 142 with switch valves V12, V13 and V14, and the adsorption tank 144 with switch valves V15, V16 and V17.

The heat exchanger 146 heats the purified pool water to a predetermined temperature range, for example, 25°–40° C., preferably 30°–35° C. Preferably, this heat exchanger is used in common with a tank 147 which stores hot water to be used in various facilities accessory to the pool 132. The heat exchanger 146 is connected to the circulation pipe 162 via switch valves V18, V19 and V20. The heat exchancer is essential for indoor pools but not for other types of pools.

The mixing unit 148 serves to maintain the filtering capability of the ceramic filters in the filtration tank 140 at a desired level as already described in detail in connection with the first aspect of the present invention. Before the filtering efficiency drops and preferably at regular intervals, the filter cake deposited on the ceramic filters is removed by backwashing them with a jet stream that is created in the unit 148 by mixing the cleaning fluid with high-pressure air supplied from a source of high-pressure air (not shown). The mixing unit 148 forms a circulation system in combination with a back wash pipe 168 that consists of two pipes, one being a pipe on the inlet side which is a branch from the circulation pipe 162 at a point between the pump 138 and switch valve V8 fitted upstream of the filtration tank 140 which is fitted with a switch valve 22 and the other being a pipe which is connected to the precoat branch pipe 164 connected to the outlet pipe from the filtration tank 140 and which is fitted with a switch valve V23.

The precoating tanks 150 and 152 are filled with filter aids that are used to form layers that not only maintain the filtering capability of the ceramic filters in the filtration tank 140 at satisfactory level but also facilitate the cleaning of the filters. Preferred filter aids are those in powder form such as diatomaceous earth and lime, those in fibrous from such as cellulose, pulp fibers and asbestos, and silica gel which is capable of selective adsorption of proteins. In a preferred embodiment, the side of each ceramic filter where the fluid will flow in is coated with a release layer formed of a powder filter aid that can be readily removed and which in turn is coated with a filtering layer formed of a fibrous filter aid, with a silica gel layer being formed between those two layers. In a typical example, the precoating tank 150 may be filled with a powder filter aid whereas the precoating tank 152 is filled with a fibrous filter aid.

The precoating tank 150 is connected to the precoat branch pipe 164 via three switch valves V27, V28 and V29 which combine with that branch pipe to form the circulation system of the present invention. The pipe 164 is a branch from the circulation pipe 162 connecting the prefilter tank 136 and the pump 138 and is connected to the junction between the outlet pipe from the filtration tank 140 and the circulation pipe 162. The precoat branch pipe 164 has switch valves V21 and V25 in two positions where it branches from the circulation pipe 162; the pipe 164 also has switch valve V26 downstream of the junction with the back wash pipe 168.

The precoating tank 152 is connected to the precoat branch pipe 166 which is a parallel branch from the precoat branch pipe 164; the precoating tank 152 forms the aforementioned circulation system together with switch valves V30, V31 and V32.

A drain pipe 172 through which the waste backwashing fluid flows is a branch from the junction between the inlet pipe to the filtration tank 140 and the circulation pipe 162. The drain pipe 172 is fitted with switch valve V24 at the branch end and switch valve V40 at the discharge end. A branch may be provided halfway of the drain pipe 172 so that the waste backwashing fluid can be discharged into the sedimentation tank 160 via switch valve V37.

A drain pipe 174 extends as a branch at a point downstream (closer to the adsorption tank 144) of switch valve V15 fitted on the inlet pipe to the adsorption tank. The drain pipe 174 is fitted with switch valve V33 at the branch end and connected to the circulation pipe 162. The pipe 174 has switch valve V35 at a point downstream of the junction with the circulation pipe 162 and it is also fitted with switch valve V39 at the drain outlet. A branch is provided halfway of the drain pipe 174 so as o permit drainage into the sedimentation tank 160 via switch valve V36. The circulation pipe 162 is fitted with switch valve V34 downstream of the junction with drain pipe 174.

It frequently occurs that the drained pool water, the waste backwashing fluid coming out of the ceramic filters in the filtration tank 140, or the waste backwashing fluid leaving the zeolite and activated carbon in the adsorption tank 144 contains too much precipitate to be immediately discharged from the purification system. In this case, the sedimentation tank 160 may be operated to have the precipitate settle down. By opening switch valve V38, the waste water freed of the precipitate can be discharged from the purification system.

The alkali tank 154 is filled with an alkali that is added to the purified pool water as required for adjusting the pH of the pool water to be within the regulated range of 5.8–8.6 since the pool water tends to become acidic on account of chlorine sanitizers which are added for disinfection purposes. The alkali tank 154 is typically filled with a solution of sodium hydroxide and it is connected to the circulation pipe 162 via switch valve V41.

The chlorine tank 156 is filled with a chlorine gas which kills or attenuates those bacteria and viruses which have been neither filtered off nor adsorbed nor killed in the filtration tank 140, disinfecting tank 142 and adsorption tank 144. The chlorine tank 156 is connected to the circulation pipe 162 via switch valve V42. In the pool water purifying system 130 shown in FIG. 9, chlorine disinfection may be omitted since the pool water can be purified satisfactorily by the sanitizing effects achieved in the filtration tank 140, disinfecting tank 142 and adsorption tank 144. However, chlorine disinfection is required by law and bacteria and viruses can be killed or attenuated more completely by chlorine disinfection. Therefore, it is recommended to perform chlorine disinfection in the purification system shown in FIG. 9.

The water in the pool 132 is replenished with make-up water from the balancing tank 158 which is preliminarily supplied with clean water such as tap water from its source (not shown) via switch valve V44. The balancing tank 158 is provided to insure that the surface of pool water is kept level and constant. The balancing tank 158 may be omitted from the pool water purifying system 130 of the present invention if it is so adapted to supply make-up water directly into the pool 132 and the overflow tank 134. By omitting the balancing tank 158, the size and hence cost of the pool facilities equipped with the pool water purifying system can be reduced.

In the case of directly supplying make-up water into the pool 132 and overflow tank 134, variations can occur in the temperature of water in the pool and the overflow tank but this can be prevented by providing a means of thoroughly mixing the clean make-up water with the pool water in the pool 132 or overflow tank 134.

The switch valves V1–V44 to be used in the present invention may be of any type but, depending on the need, part or all of them may preferably be replaced by solenoid valves which permit easy control in opening and closing operations.

The control unit 180 allows automatic control in selectively opening or closing switch valves V1–V44 which are necessary in establishing various lines including the pool water circulation line, pool water drain line, filtration tank back wash line, adsorption tank back wash line and precoat line.

In order to make the most of the features of the pool water purifying system 130 of the present invention, the pool 132 is preferably of an overflow type that is supplied with pool water from the bottom. If pool water is supplied from the bottom of the pool, precipitates such as impurities in the pool water will not settle on the bottom of the pool and, instead, the pool water can be drained as it overflows the pool while maintaining a constant level. Further, the drained pool water is completely clean, leaving no residual impurities. Therefore, the pool water retains an extremely high level of clarity and bathers or swimmers will feel no discomfort due to sticky hair or skin even if the pool length exceeds 25 m.

Having outlined the basic features of the composition of the pool water purifying system 130 of the present invention, we now describe its operation in a specific way.

When using the pool, the control unit 180 in the pool water purifying system shown in FIG. 9 opens switch valves V2, V3, V5, V8, V9, V10, V12, V13, V15, V16, V34, V18 and V19 (V41, V42 and V44 are opened as required) while closing the other switch valves, thereby establishing the pool water circulation line indicated by a dashed line.

The pool water overflowing the pool 132 is retained temporarily in the overflow tank 134 and thereafter flows into the prefilter tank 136 in predetermined amounts. In the prefilter tank 136, hair, waste of threads or yarns and other coarse dust particles are trapped and removed from the pool water, which is given a sufficient circulating force (pressure and flow rate) by the circulating pump 138 to be sent to the filtration tank 140.

In the filtration tank 140, all fine particles present in the pool water, including not only those larger than 1 μm but also those with sizes of 0.25–1 μm, are trapped by the ceramic filters. The filtered pool water is sent to the disinfecting tank 142 where the bacteria and viruses that are contained in the water but which could not be filtered off in the filtration tank 140 are killed, controlled or attenuated by ultraviolet rays and ozone. The thus sanitized water is sent to the adsorption tank 144.

In the adsorption tank 144, malodor components such as ammonia, colorants, combined chlorine, the decomposition products of bacteria and viruses and other contaminants in the pool water are adsorbed on zeolite and activated carbon, whereby clean pool water is obtained. The purified pool water is heated by the heat exchanger 146 to a predetermined temperature, typically about 30° C. If necessary, the pH of the pool water is adjusted to the range of ca. 7–8 by alkali treatment in the alkali tank 154. After chlorine disinfection required by law, the pool water is returned to the pool 132, preferably from its bottom.

In this way, the pool water is purified as it is circulated along the circulation line indicated by dashed line in FIG. 9.

During this circulating purification, the quantity of the water in the pool 132 can be adjusted by controlling the amount of circulating water from the overflow tank 134, so there is no need to supply any additional clean water. However, in the case where the pool 132 is filled with water for the first time or where the quantity of pool water is far short of the necessary level, clean water such as tap water may be supplied from its source into the balancing tank 158 via switch valve V44 and thence into the pool 132.

It has been verified by analysis that the water purified by the circulating system described above satisfies all the test criteria for the quality of water and hence has been found to be completely satisfactory for use as pool water.

If the pool water purifying system of the present invention is used, the need of cleaning the pool 132 itself is substantially eliminated. However, it may sometimes become necessary to clean the pool after draining the pool water. In this case, the control unit 180 is operated to close switch valves V2, V3, V9, V10, V12, V13, V15, V16 and V34 while opening switch valves V1, V4, V11, V14, V17 and V40, thereby establishing the pool water drain line indicated by a one-long-and-one-short dashed line in FIG. 9, along which the pool water can be drained by running pump 138. If the pool water is to be drained by gravity without using the pump 138, switch valves V5 and V6 are also closed whereas switch valve V7 is opened to establish another pool water drain line which is also indicated by a one-long-and-one-short dashed line in FIG. 9.

The pool water being drained form the pool 132 passes through the drain line 170, circulation pipe 162 and drain line 174 and is discharged from the system via switch valve V40.

After the pool water circulating line shown in FIG. 9 has been activated for a predetermined time, it may become necessary to clean the ceramic filters in the filtration tank 140 by shifting from the pool water circulation line. In this case, the control unit 180 closes switch valves V3, V8 and V12 while opening switch valves V21, V22, V23, V26 and V29, thereby establishing an acceleration line (which is part of the filtration tank back wash line indicated by a dashed line in FIG. 10) that is a closed loop consisting of the circulation pipe 162, switch valve V5, pump 138, circulation pipe 162, switch valves V6 and V22, back wash pipe 168, mixing unit 148, back wash pipe 168, switch valves 23 and 26, precoat pipe 164, switch valve V29, precoat pipe 164, switch valve V21 and circulation pipe 162. With this acceleration line formed, a backwashing jet stream containing high-pressure air is circulated for acceleration. After the jet stream has been sufficiently accelerated, the control unit 180 closes switch valve V26 and cuts off the acceleration line. At the same time, the control unit 180 opens switch valves V25, V24 and V37, whereby the accelerated jet stream containing high-pressure air as supplied from the mixing unit 148 passes through switch valves V23, V25 and V10 and flows back into the outlet pipe to the filtration tank 140, in which it dislodges not only the filter cake deposited on the ceramic filters but also the filter aids precoated on them. The backwashing fluid now carrying the filter cake and the filter aids leaves the filtration tank 140 from the inlet pipe and passes through switch valves V9 and V24, drain pipe 172 and switch valve 37 to be discharged into the sedimentation tank 160. When the backwashing fluid has become substantially free from the filter cake and filter aids, switch valve 37 may be closed whereas switch valve 39 is opened to have said fluid discharged directly from the system.

When the filter cake, filter aids and other precipitates in the fluid have settled down completely in the sedimentation tank 160, switch valve V38 may be opened to have the supernatant discharged from the system.

While the method of cleaning porous ceramic filters which is the first aspect of the present invention is preferably applied no implement the above-described backwashing operation, this is not the sole case of the present invention and high-pressure air supplied from a flush tank may be used as a backwashing medium in place of the jet stream prepared by mixing a cleaning fluid with high-pressure air.

Up to the stage of disinfecting tank 142, the above-described pool water drain line is maintained and the control unit 180 closes switch valves V2, V3, V9, V10, V12 and V13 while opening switch valves V1, V4, V11 and V14. However, in order to perform cleaning with zeolite and activated carbon in the adsorption tank 144, the control unit 180 closes switch valves V15 and V34 while opening switch valves V17, V33, V35 and V36 so as to establish an adsorption tank back wash line which is partly shown by a one-long-and-one-short dashed line in FIG. 10. When this back wash line is formed, the pool water which comes from the pool 132 past drain pipe 170 and circulation pipe 162 flows in the following path indicated by one-long-and-one-short dashed line: it passes through switch valves V14, V17 and V16 to flow into the adsorption tank 144 via the outlet pipe, washes the zeolite and activated carbon in the tank 144, flows out of it through the inlet pipe, then passes through switch valve V33, drain pipe 174, switch valves V35 and V36 and to be discharged into the sedimentation tank 160. If desired, a bag for recovering zeolite and activated carbon may be attached to the outlet of the drain pipe 174 to the sedimentation tank 160. If it is found that the pool water no longer contains precipitate, switch valve 36 may be closed whereas switch valve V40 is opened to have the water discharged directly from the system. When the precipitate has completely settled in the sedimentation tank 160, the supernatant of the water may be directly discharged from the system. When the cleaning of the adsorption tank 144 ends, the control unit 180 selectively opens and closes the necessary switch valves to reestablish the pool water circulation line.

Figure 11:
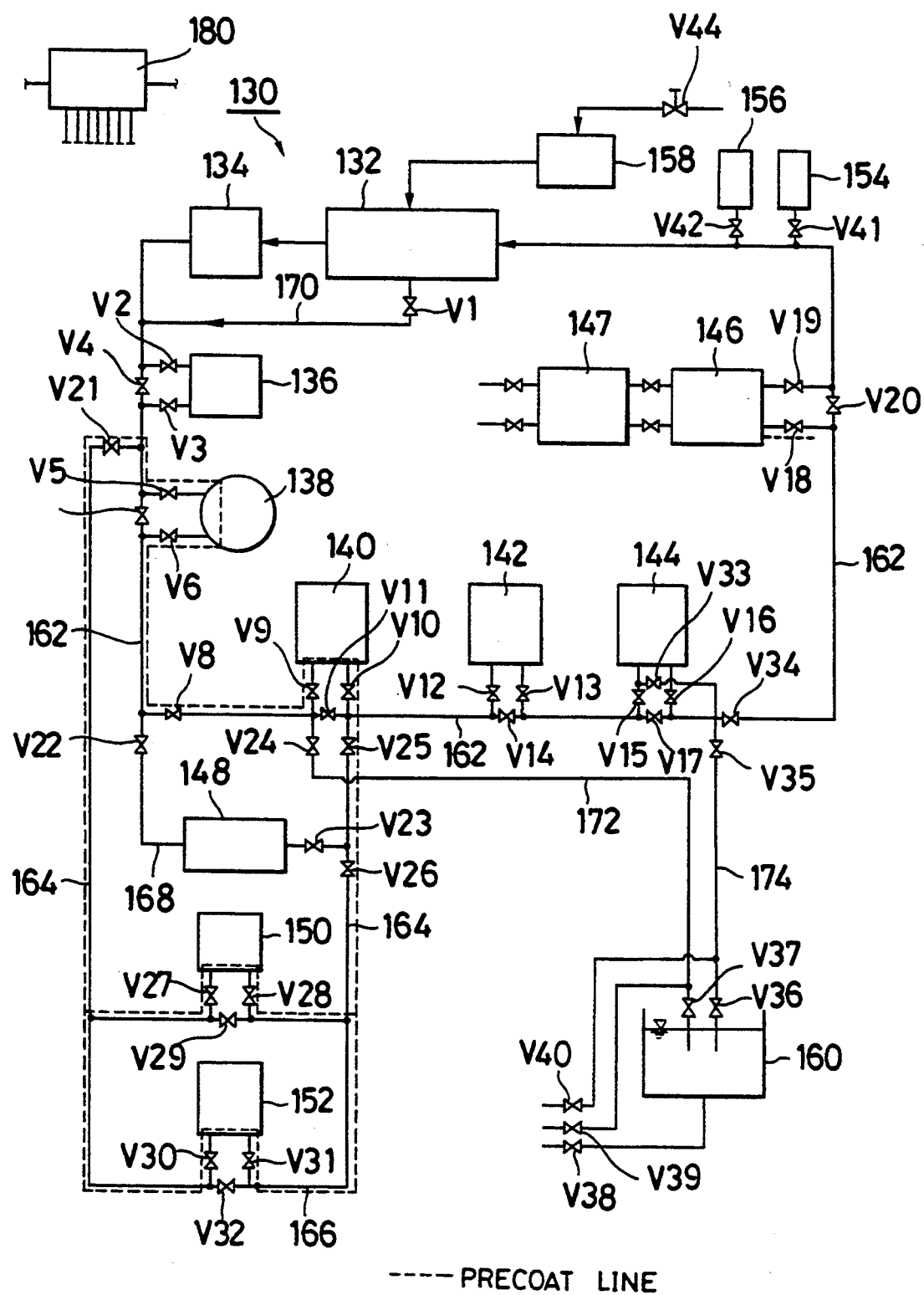

After the ceramic filters in the filtration tank 140 have been thoroughly cleaned, the control unit 180 makes a shift from the filtration tank back wash line to the state shown in FIG. 11. Stated more specifically, the control unit 180 closes switch valves V22 V23 and V24, as well as switch valves 29 and 32 (if they have been closed) while opening switch valves V8, V26, V27 and V28, so as to establish the precoat line indicated by a dashed line in FIG. 11. When this precoat line is formed, the powder filter aid in the precoating tank 150 is injected into the pool water to form a slurry, which passes through switch valve V27, precoat pipe 164, switch valves V21 and V5, pump 138 (which is preferably a slurry pump), switch valve V6, circulation pipe 162 and switch valves V8 and V9 to flow into the filtration tank 140, where the powder filter aid is deposited on the ceramic filters to form a release layer. Thereafter, the pool water filtered by passage through the ceramic filters leaves the filtration tank 140 and passes through switch valves V25 and V26, precoat line 164 and switch valve V28 to return to the precoating tank 150. In this manner, the pool water is circulated within the precoat line to form a predetermined amount of release layer on the ceramic filters in the filtration tank 140.

Subsequently, the control unit 180 closes switch valves V27 and V28 while opening switch valves V30 and V31, whereby establishing the other precoat line also indicated by a dashed line in FIG. 11. When this line is formed, the fibrous filter aid in the precoating tank 152 is supplied into the filtration tank 140 where it is deposited to form a filtering layer over the release layer. When a predetermined amount of the filtering layer has formed, the precoat line is shifted to the pool water circulation line by selectively opening and closing the necessary switches with the control unit 180.

Thus, according to the pool water purification system of the present invention, a plurality of lines including a pool water circulation line, pool water drain line, a filtration tank back wash line, precoat lines and an adsorption tank back wash lines can be established with a smaller number of pipes and switch valves. In addition, conversion among those lines can be achieved with solenoid valves in an easy and instantaneous manner.

In the embodiment described above, one unit of pump 138 is used. If desired, a plurality of pump units may be selectively driven depending on the type of specific line to be established.

The application of the pool water purifying system of the present invention is in no way limited to the filtration of pool water in a circulating manner and it is also applicable to various operations of fermentation and water treatment. It should be noted that adding other accessory tanks and facilities, as well as adding their associated pipes and switch valves and even establishing various other lines using those pipes and switch valves are also included within the scope of the present invention.

The circulating purification apparatus of the present invention employs a circulation system in which a plurality of tanks including a filtration tank using porous ceramic filters, a disinfecting tank and an adsorption tank are interconnected by means of one main pipe combined with three switch valves for each tank. Hence, in addition to the advantages of the first aspect of the present invention, the following advantages are attained: various lines can be established easily; the use of a smaller number of components permits conversions among the various lines to be easily accomplished by selectively opening and closing the switch valves; and, hence, the overall cost of the system is reduced.

Using the above-described circulation system, the pool water purifying system of the present invention offers the advantages of ease of establishing various lines, their compactness, ease with which various switch valves can be selectively opened and closed in a precisely controlled way, and low cost. Further, the filtration and adsorption tanks can be cleaned periodically in an easy way and, at the same time, the filter media in the filtration tank can be easily precoated with filtration aids. Hence, in addition to the advantages of the first aspect of the present invention, the system can be operated continuously in good condition without any drop in its filtering capability.

The third aspect of the present invention which related to an apparatus for purifying pool water in a circulating manner is described below in detail with reference to the preferred embodiments shown in FIGS. 12-14.

The apparatus is characterized in that various kinds of water purifying means are positioned on a platform that is splittable into at least two segments and that the joining portions of connecting means that establish connection to the pool and water supply and drain facilities on the site of installation can be rotated in a horizontal plane to be mounted in desired positions.

The apparatus, once assembled in a factory, can be divided into a plurality of units by splitting the platform, which units are small enough to be carried on vans or some other suitable vehicles and transported to the site of installation. With almost all parts of the apparatus having been assembled in the factory, a complete system can be built on the installation site merely by recombining the split segments of the platform and reconnecting the pipes and other parts that were disconnected before shipment. The use of machines and tools is generally limited on the installation site; however, in the absence of the need to achieve precise positioning and installation of many system components such as filtration and disinfecting equipment or to perform complicated piping work, the apparatus of the present invention can be installed on the site in an easy and quick way.

Further, in order to connect the apparatus to the pool and water supply and drain facilities on the installation site, the joining portions of connecting means on the apparatus may be rotated in a horizontal plane in such a way that they become oriented in correct positions and directions that fir the individual facilities on the site. Hence, the apparatus can be readily installed in any place without changing its basic layout.

Figure 12:
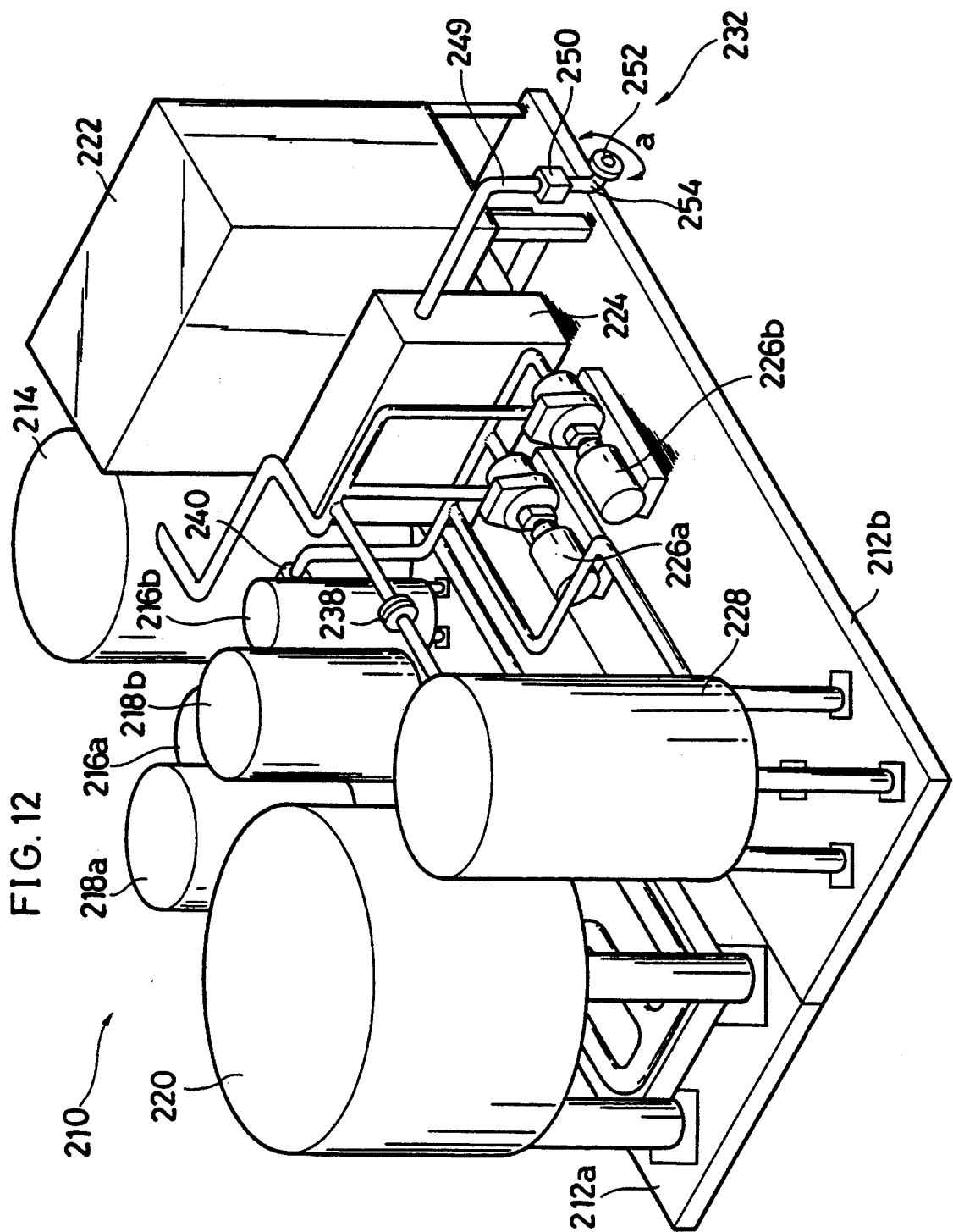
FIG. 12 is a schematic perspective view showing another embodiment of the apparatus of the present invention for purifying pool water in a circulating manner.
Figure 13:
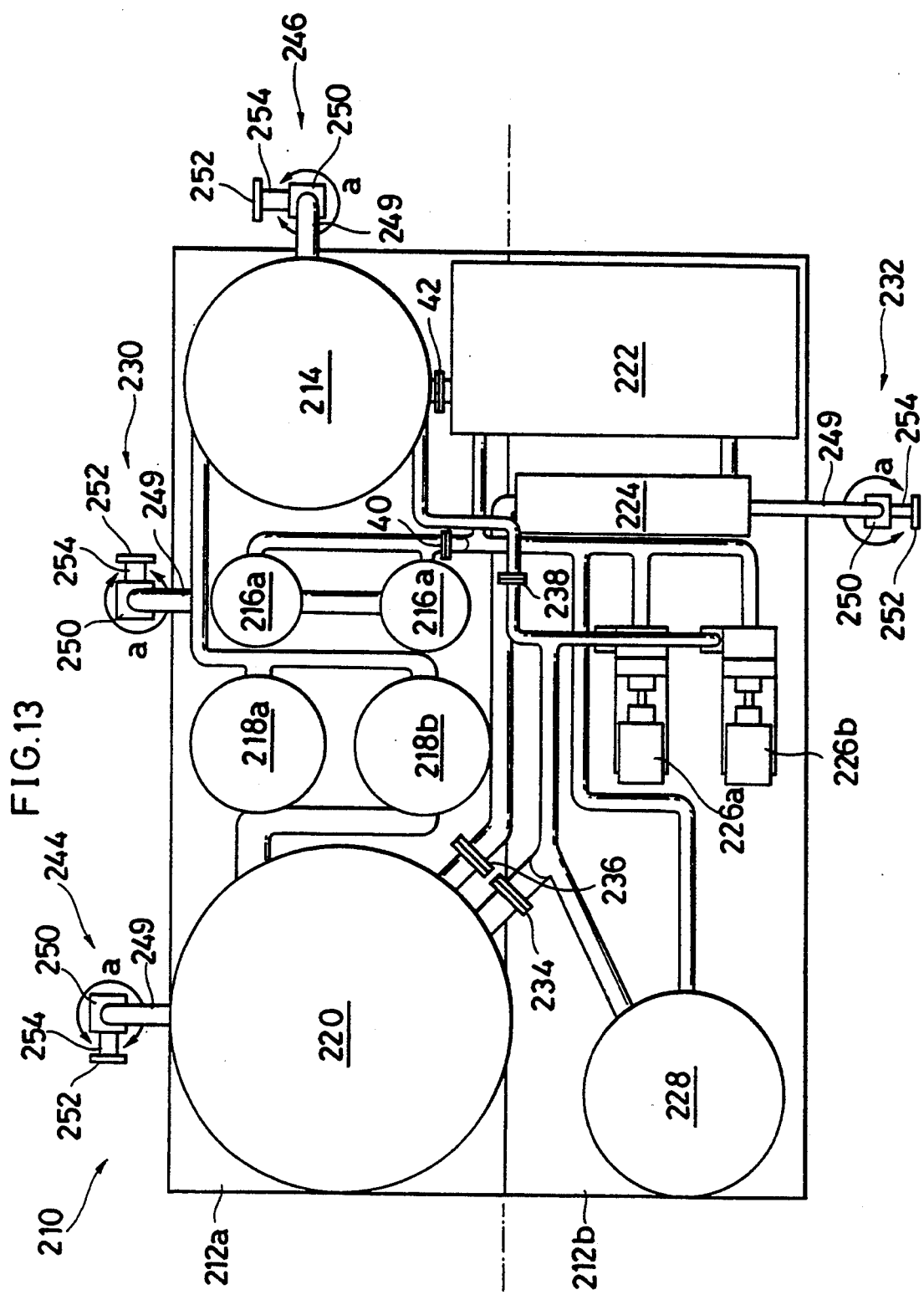
FIG. 13 is a schematic plan view of the purifying apparatus shown in FIG. 12.

FIG. 12 is a schematic perspective view showing an embodiment of the apparatus of the present invention which is designed to purify pool water in a circulating manner said apparatus is hereunder referred to as the "purifying apparatus"), and FIG. 13 is a plan view of that purifying apparatus.

The purifying apparatus generally indicated by 210 in FIG. 12 comprises the following basic components: a platform 212 that is splittable into two segments 212a and 212b along one-short-and-one-long dashed line in FIG. 13; a filtration tank 214 that is packed with porous ceramic filters; prefilters 216a and 216b; disinfecting tanks 218a and 218b; an adsorption tank 220 (filtration tank 214, prefilters 216a and 216b, disinfecting tanks 218a and 218b and adsorption tank 220 are positioned and fixed on platform segment 212a); a filter aid tank 222; a heat exchanger 224; circulating pumps 226a and 226b; and a hot water tank 228 (222, 224, 226a, 228b and 228 are positioned and fixed on platform segment 212b). The piping on the purifying apparatus 210 has many valves for regulating the transport path of introduced pool water that are fitted in the necessary positions but those valves are omitted from FIGS. 12 and 13.

In the embodiment shown in FIGS. 12 and 13, the water discharged from the pool (the term "water" as it appears hereunder without any qualifier shall refer to "pool water") is introduced into the purifying apparatus 210 via an inlet port 230 (see FIG. 13) connected to the pool. The introduced water, due to the "head" with respect to the pool and by means of the suction and discharge of the circulating pump 226a or 226b, is passed through the prefilters 216a and 216b, circulating pump 226a or 226b, the filtration tank 214, disinfecting tanks 218a and 218b, and the adsorption tank 220 and the resulting clean water is heated to a predetermined temperature by the heat exchanger 224 and returned to the pool via an outlet port 232. Those tanks 214, 216a, 216b, 218a, 218b and 220, the filter aid tank 222, as well as circulating pumps 226a and 226b and the heat exchanger 224 may be the same components as those used in the pool water purifying system of the present invention and, hence, their details including actions will not be described below.

The hot water tank 228 stores make-up water that is supplied when the amount of pool water or the water to be used by showers, disinfecting tanks, eye bathers and other accessories to the pool becomes insufficient.

The purifying apparatus 210 is equipped with a back-washing unit (not shown) for backwashing the porous ceramic filters described in connection with the first aspect of the present invention but there is no particular limitation on the method of backwashing those filters.

The various components (or tanks) of the purifying apparatus 210 are fixed in predetermined positions on the platform 212, which as already mentioned is splittable into two segments 212a and 212b along the one-long-and-one-short dashed line shown in FIG. 13. To state more specifically, flanges 234, 236, 238, 240 and 242 on the pipes that interconnect the components of the purifying apparatus 210 are removed and, them, the platform 212 is split into two segments 212a and 212b, whereby the apparatus can be divided into two units along the one-long-and-one-short dashed line in FIG. 13. If the apparatus 210 is 5500 mm long and 3600 mm wide, it can be divided into two units each having the size 5500×1800 mm. It has been impossible to carry apparatus of the initial size on a van but the two units of one half the initial size can be transported if two vans are used.

Therefore, after preassembling the purifying apparatus in a factory, the platform 212 may be split into two segments 212a and 212b so as to divide the apparatus into two units, which are individually shipped to and placed on the site of installation; thereafter, the platform segments 212a and 212b are put together and the flanges that were removed before shipment are reconnected (the positions of the joining parts have already been determined during assembly work in the factory and repositioning them is very easy to accomplish) may simply be reconnected in order to reassemble the purifying apparatus 210 in a complete form. Usually, the site of installation is narrow and, in addition, the use of machines and tools is limited. However, in the absence of the need to achieve precise positioning and installation of many system components (purifying tanks) or to perform complicated piping work, the complete purifying apparatus can be assembled on the site in a very easy and quick way. Further, the load of operators and the closing time required for replacement of the apparatus can be considerably reduced.

The method of recombining the platform segments 212a and 212b is not limited in any particular way and various common techniques including the use of bolts and nuts can be adopted. If necessary, the two segments can be fixed permanently by welding or some other techniques.

The method of connecting pipes to the individual tanks also is not limited to the flange-type joints shown in FIG. 13 and various known joining techniques can be adopted such as coupling with unions and couplers, threading, etc.

Needless to say, dividing the purifying apparatus into two units is not the sole case of the present invention and it may be divided into three or more units depending on various factors such as the means of transportation, the area of the installation site and the size of the apparatus. The positions of pipes that are disconnected from the individual components of the apparatus 210 when it is divided into two or more units are not limited to the case shown in FIG. 13 and any suitable positions may be selected as appropriate for the specific layout of the apparatus.

It should also be noted that in order to facilitate splitting and reassembling operations, flexible hoses may be used as required.

The purifying apparatus 210 has four connecting means by which it is connected to pipes leading to external facilities such as the pool and the water distribution equipment on the installation site; the four connecting means are the inlet port 230 and outlet port 232 which are connected to the pool, a disposal port 244 through which the activated carbon and zeolite packed in the adsorption tank 220 are discarded, and another disposal port 246 through which the fluid that has been used to backwash the ceramic filters is discarded.

The joining portion that establishes connection between each of those connecting means and the associated external piping is so adapted that it can be set in any desired position in a horizontal direction.

As already mentioned, the purifying apparatus 210 of the present invention is first assembled in a factory, then divided into two or more units, which are recombined into a complete system on the site of installation. In practice, however, the positions of pipes on various facilities that are accessory to the pool, or the pipes which are to connect to the purifying apparatus 210, vary from pool to pool and those pipes are rarely positioned in such a way that they can be immediately connected to the purifying apparatus 210. This problem, coupled with the aforementioned difficulty of transportation, has made it unavoidable in the prior art to adopt the practice of positioning individual system components (tanks) on the site before they are installed and reassembled into the complete system.

In contrast, the purifying apparatus 210 of the present invention is so adapted that it can be disassembled into two or more units an the joining portions of the respective connecting means can be rotated in a horizontal plane so that they are set in any desired positions. As a result, the apparatus can be transported easily by small means of transportation and, yet, it can be reassembled on any installation site easily in a short period of time.

In the purifying apparatus 210 shown in FIGS. 12 and 13, each of the connecting means consists basically of a joint 250 which is connected to pipe 249 on the apparatus 210 and an L-shaped pipe 254 having a flange 252 which serves as a joining portion. By rotating the L-shaped pipe 254 in the direction of arrow a, the flange 252 is brought and fixed at a desired position in the horizontal direction in such a way that the pipe 249 can be connected to an associated external pipe irrespective of its direction.

Figure 14:
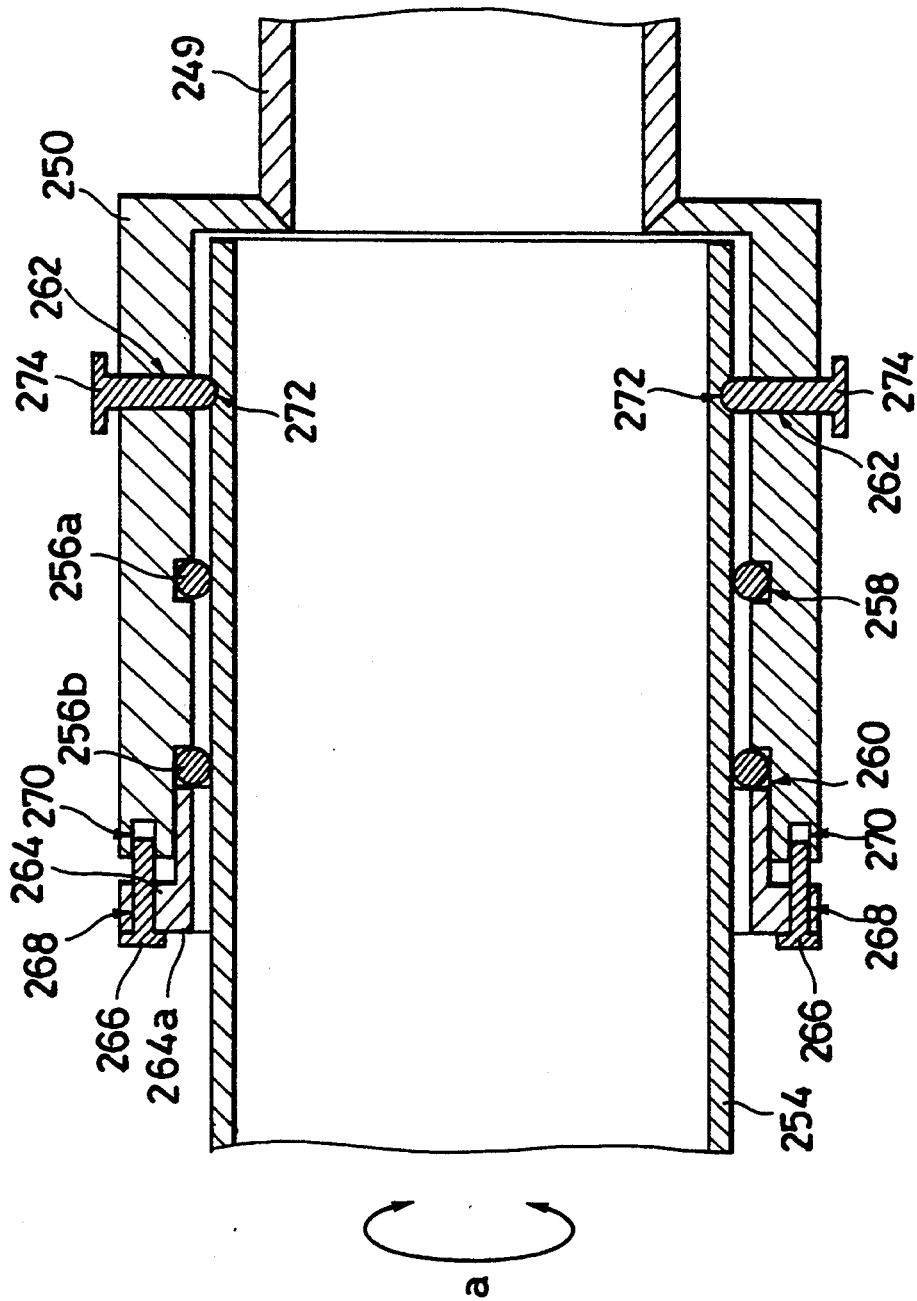
FIG. 14 is a schematic sectional view of an example of the connecting means used in the purifying apparatus shown in FIG. 12.

FIG. 14 is a schematic cross-sectional view of an example of the connecting means used in the purifying apparatus 210 of the present invention. As already mentioned, the connecting means shown in FIG. 14 consists basically of joint 250 and L-shaped pipe 254.

The joint 250 is a generally cubic member having a cylindrical hollow portion and the L-shaped pipe 254 is inserted into this hollow portion in such a way that it freely rotatable in the direction of arrow a. The joint 250 has formed in its wall a groove 258 for receiving an O-ring 256a that insures liquidtightness between the joint 250 and the L-shaped pipe 254, a recess 260 into which an O-ring 256b and a pressing member 264 (to be described below) are to be inserted, and threaded holes 262 into which bolts 274 are threaded to secure the L-shaped pipe 254.

The pressing member 264 is a tubular element having a flange portion 264a at the rear end. When the pressing member 264 is inserted into the recess 260 by pushing the flange portion 264a, said member presses the O-ring 256b to enhance the reliability of liquidtightness between the joint 250 and the L-shaped pipe 254.

The flange portion 264a of the pressing member 264 is provided with through-holes 268 through which bolts 266 are inserted. The end face of the joint 250 which faces the flange portion 264a is provided with threaded holes 270 into which bolts 266 are threaded.

The L-shaped pipe 254 has a securing groove 272 formed in an area near its front end (the "front" of the pipe 254 is the portion which is first inserted into the joint 250) in the position that corresponds to the threaded holes 262.

When connecting the apparatus 210 to an external pipe using the connecting means described above, the position of the joining portion, or the flange 252, is adjusted and the flange is secured by the following procedure. As already mentioned, the L-shaped pipe 254 is inserted into the hollow portion of the joint 250. Although the L-shaped pipe 254 is held almost in a liquidtight condition by means of the O-rings 256a and 256b, it is freely rotatable in the direction of arrow a. Therefore, the position of the flange 252 (see FIGS. 12 and 13) can be adjusted by rotating the L-shaped pipe 254 until it comes into registry with the direction of the external pipe to be connected, such as the one extending from a facility on the site of installation.

After adjusting the position of the flange 252, bolts 274 are tightened so that they are pressed against the bottom of the securing groove 272 to insure that the L-shaped pipe 254 will not rotate or slip out of the joint 250.

Subsequently, bolts 266 are tightened so that the pressing member 264 will press the O-ring 256b until it flattens by a slight but sufficient degree to insure the liquidtightness between the joint 250 and the L-shaped pipe 254.

There is no particular limitation on the method of connecting the joint 250 to the pipe 249 on the purifying apparatus 210 and any known methods including welding and threading can be employed. The method of connecting an external pipe on the installation site to the connecting means (on the purifying apparatus 210) also is not limited to the use of flange 252 and various other known methods can be adopted such as welding, threading and the use of unions or other types of couplings.

The connecting means that can be used with the purifying apparatus of the present invention is not limited to the particular construction described above and any other constructions can be adopted as long as they permit the joining portion (flange 252 in the example shown in FIG. 12) to rotate in the direction of arrow a until it is brought to a desired position.

The purifying apparatus of the present invention also is not limited to the particular embodiment described above and various modifications can be made in accordance with the use, size and other parameters of the pool to which said apparatus is to be applied; to mention a few examples of such modifications, an additional filtration or disinfecting tank may be added, or unnecessary components may be eliminated, or an entirely different type of purifying apparatus may be added.

While the present invention as it relates to an apparatus for purifying pool water in a circulating manner has been described above in detail with particular reference being made a preferred embodiment, it should be understood that the invention is by no means limited to that particular embodiment and that various improvements and modifications can be made without departing from the scope and spirit of the invention.

As described above in detail, the apparatus of the present invention for purifying pool water in a circulating manner is characterized in that once assembled in a factory, it can be divided into a plurality of units by splitting the platform and that those units are small enough to be carried on vans or some other suitable vehicles and transported to the site of installation. With almost all parts of the apparatus having been assembled in the factory, a complete system can be built on the installation site merely by recombining the split segments of the platform and reconnecting the pipes and other parts that were disconnected before shipment. The use of machines and tools is generally limited on the installation site; however, in the absence of the need to achieve precise positioning and installation of many system components such as filtration and disinfecting tanks or to perform complicated piping work, the apparatus of the present invention can be installed on the site in an easy and quick way.

Further, in order to connect the apparatus to the pool and water supply and drain facilities on the installation site, the joining portions of connecting means on the apparatus may be rotated in a horizontal plane in such a way that they become oriented in correct positions and directions that fit the individual facilities on the site. Hence, the apparatus can be readily installed in any place without changing its basic layout.

Figure 16:
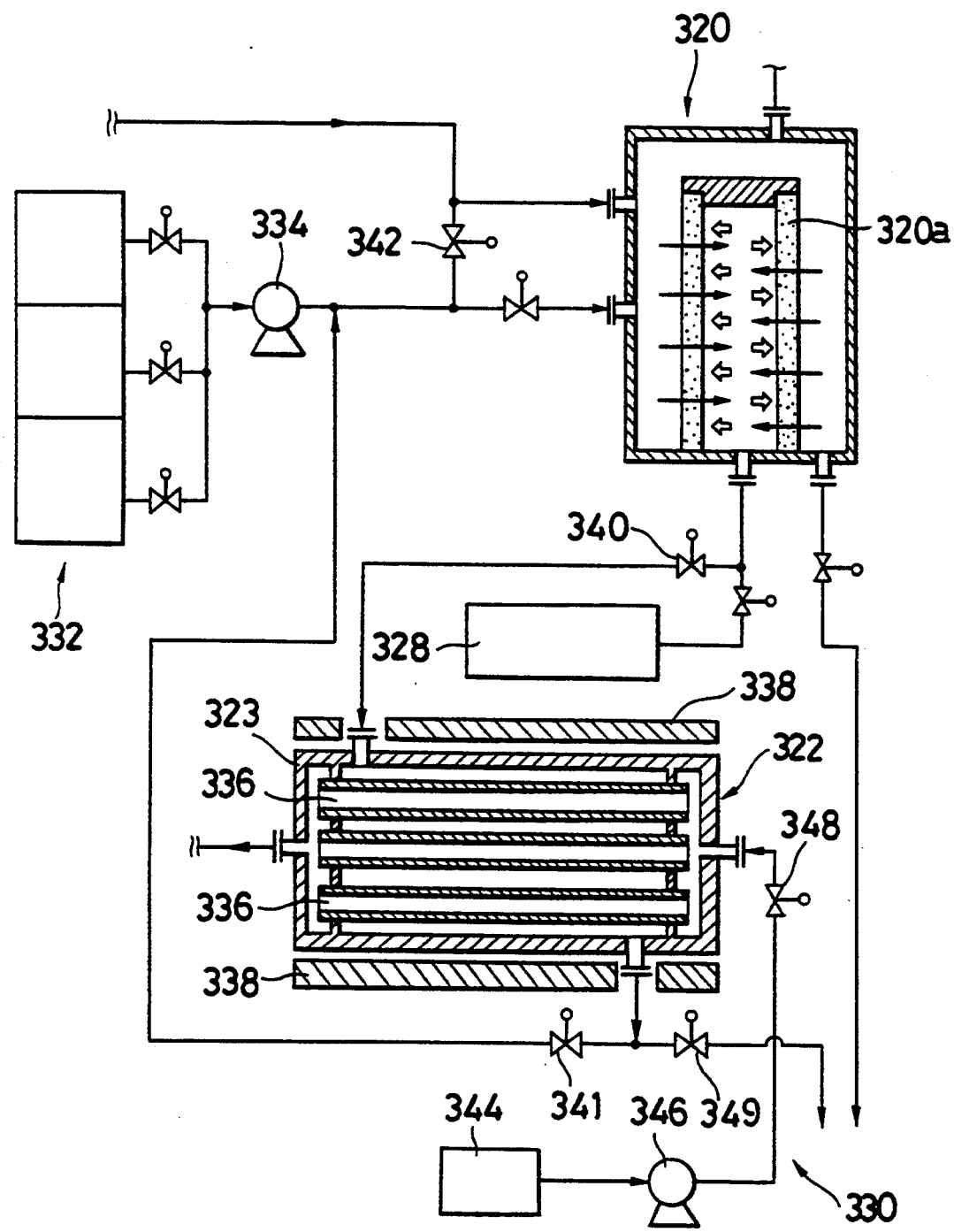
FIG. 16 is a perspective view of an embodiment of the ultrafiltration means used in the purifying system shown in FIG. 15.
Figure 17:
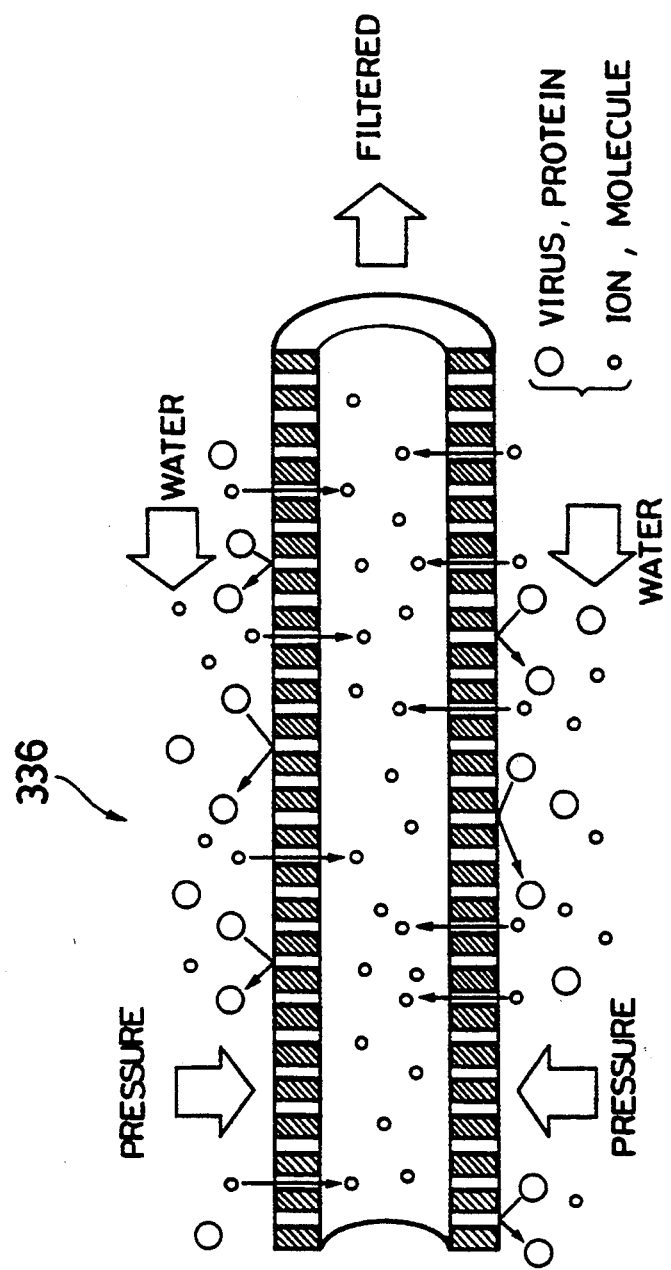
FIG. 17 is a schematic sectional view of the ultrafiltration means shown in FIG. 16.

The fourth aspect of the present invention relates to a system for purifying pool water and this is described below in detail with reference to the preferred embodiments shown in FIGS. 15-17.

Figure 15:
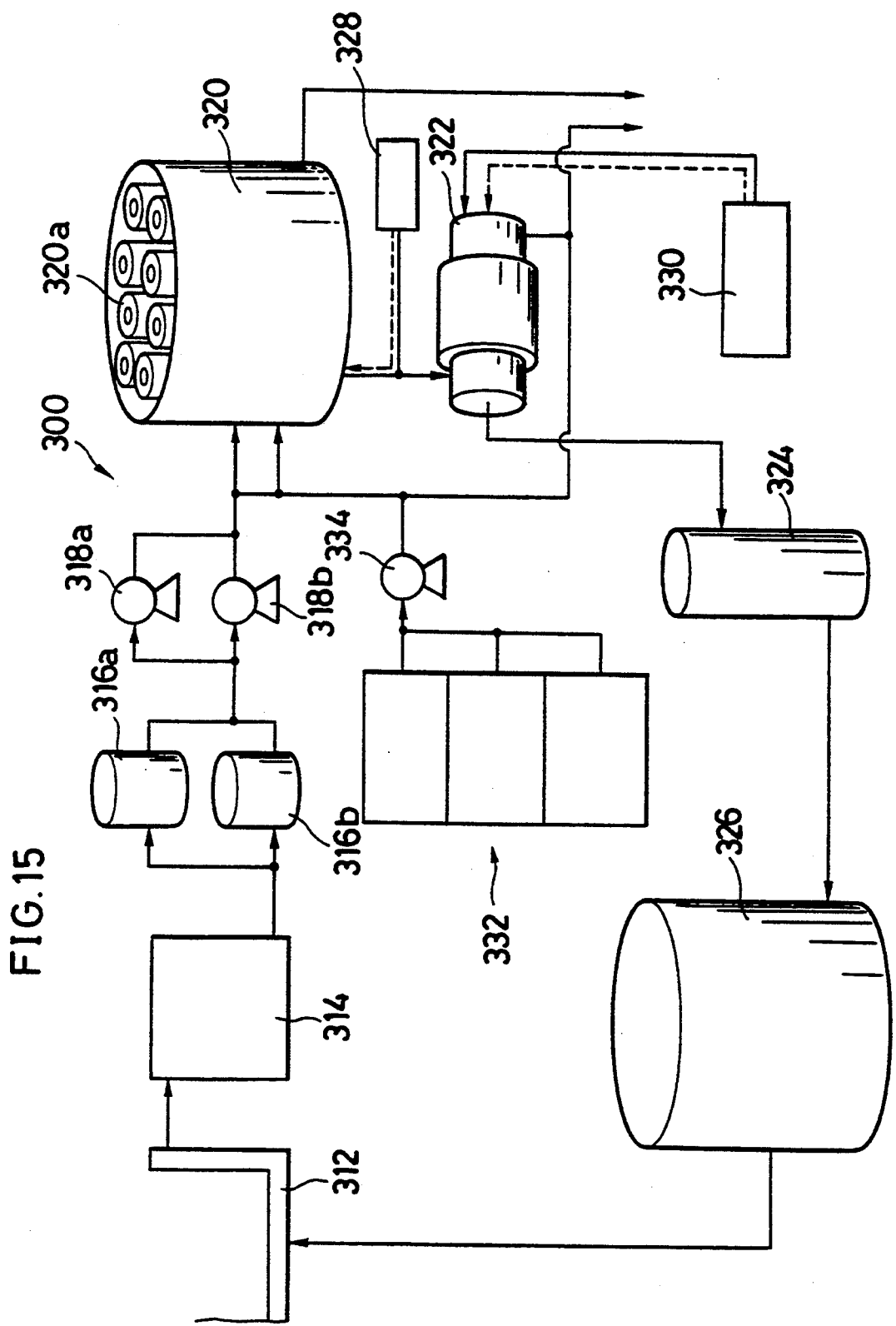
FIG. 15 is a diagram showing the concept of another embodiment of the pool water purifying system of the present invention.

FIG. 15 is a diagram showing the concept of the basic layout of the pool water purifying system which is generally indicated by 300. This system 300 is a purifying apparatus that comprises a filtration means, a disinfecting means and an adsorption means in essentially the same manner as in the first, second and third aspects of the invention, except that the filtration means is composed of a ceramic filter assembly and an ultrafiltration means that is provided downstream of said filter assembly and that performs ultrafiltration on the pool water that has been filtered by said filter assembly. Although only the basic layout of the purifying system 300 is shown in FIG. 15, it should of course be understood that the system may be equipped with various tanks, valves, pipes and devices as are necessary for handling pool water as typically shown in FIG. 9.

In the water purifying system 300, the pool water overflowing a pool 312 flows into an overflow tank 314 and thence supplied to prefilters 316a and 316b such as carbon filters, where it is freed of hair, dust and other relatively large impurities. Thereafter, the pool water is forced by pumps 318a and 318b to flow into a microfiltration tank 320 accommodating a plurality of porous ceramic filters 320a. The pool water that has been subjected to microfiltration by ceramic filters 320a flows into an ultrafiltration unit 322 where it is subjected to ultrafiltration. Thereafter, the pool water flows into a disinfecting tank 324 where it is disinfected with ultraviolet radiation and ozone. The disinfected pool water then flows into an adsorption tank 326 where malodor substances such as ammonia, as well as viruses and bacterial killed in the disinfecting tank 324 are removed by adsorption on activated carbon or some other suitable adsorbent. The resulting purified pool water is returned to the pool 312.

The microfiltration tank 320 and the ultrafiltration unit 322 are equipped with backwashing units 328 and 330, respectively. A filter aid supplier 332 is also connected to the two filtration units via a slurry pump 334.

Detailed description of the purifying system 300 is omitted here since it is essentially the same as the already described apparatus except that ultrafiltration unit 322 is included as a filter means in addition to ceramic filters 320a. As shown schematically in FIG. 16, the ultrafiltration unit 322 comprises a plurality of cylindrical ultrafiltration membranes 336 placed within a cylindrical casing 323 which is surrounded by an ultrasonic wave generator 338.

The pool water flowing into the microfiltration tank 320 undergoes microfiltration with ceramic filters 320a and subsequently flows into the ultrafiltration unit 322 via valve 340. Part of the pool water flowing into the casing 323 from around the ultrafiltration unit 322 is freed of proteins, viruses and other very small particles as it passes through the ultrafiltration membranes 336 and, thereafter, it flows out of the unit 322 from one end. The other part of the pool water does not undergo ultrafiltration and directly flows out of the unit 322. This part of the pool water passes through valve 341 and, after being preferably added with small amounts of filter aids (e.g. diatomaceous earth, silica and activated carbon) that are supplied from the unit 332 by means of slurry pump 334, flows through valve 342 and is mixed with the pool water from the pool 312 before returning to the microfiltration tank 320.

While various impurities originating from the human body and other sources can contaminate the pool water, those impurity particles which have sizes of ca. 0.2-0.5 $\mu$m and above as exemplified by bacteria including *E. coli, v. cholerae, S. typhi* and *P. aeruginosa* can be removed by the porous ceramic filters 320a but impurity particles of smaller sizes cannot be effectively removed by them. Therefore, in the fourth aspect of the present invention under discussion, an ultrafiltration membrane such as one made of hollow fibers which is indicated by 336 in FIG. 17 is used to trap small residual particles in the pool water having sizes of ca. 0.001-0.2 $\mu$m which comprise proteins (typically 0.002-0.01 $\mu$m), viruses (typically 0.01-0.1 $\mu$m), and bacteria (typically 0.2-0.5 $\mu$m) that could not be completely removed by the ceramic filters. However, the molecules and ions that are necessary for pool water as exemplified by metal ions (e.g. $Na^+$) and anions (e.g. $cl^-$) are not trapped and will simply pass through the ultrafiltration membrane 336.

It has heretofore been impossible to filter a large volume of pool water using filters that have as small voids as the ultrafiltration membrane 336 because they are soon clogged. However, the present inventor has for the first made it possible to perform ultrafiltration on a large volume of pool water by subjecting it to microfiltration with ceramic filters before ultrafiltration.

The ultrafiltration unit 322 used in the fourth aspect of the present invention is equipped with backwashing unit 330 not only to prevent the drop in the filtering efficiency of the ultrafiltration membranes 336, thereby maintaining a high operation efficiency but also to reduce the frequency of replacements of expensive ultrafiltration membranes. The backwashing unit 330 comprises a tank 344 for supplying cleaning water, a pump 346 and the ultrasonic wave generator 338 connected to a drive source (not shown). The procedure of backwashing the ultrafiltration unit 322 is as follows. First, close valves 340 and 341, and open valves 348 and 349 that have been closed. Then, drive the pump 346 so that cleaning water is supplied from the tank 344 to flow into the ultrafiltration unit 322 through the outlet. The cleaning water flows back from the inside to the outside of each ultrafiltration membrane 336 so as to dislodge the fine impurity particles that have been trapped by the ultrafiltration membranes 336. The cleaning water now containing the dislodged impurity particles leaves the ultrafiltration unit 322 via a bypass outlet, passes through valve 349, and is subsequently discharged from the system. During this backwashing cycle, the ultrasonic wave generator 322 generates ultrasonic waves that are applied toward the center of the ultrafiltration unit 322, so that the ultrafiltration membranes 336 are vibrated to facilitate the dislodging of the trapped fine impurity particles, thereby enhancing the efficiency of the backwashing operation.

The ultrafiltration membrane to be used in the present invention is not limited to any particular type and various known ultrafiltration membranes (i.e., hollow fiber membranes) may be used, with Kuraray UF filter of Kuraray Co., Ltd. being mentioned as a typical example. The applicable hollow fiber membrane may be of a type that permits ultrafiltration from its outside to the inside or of a type that permits ultrafiltration in reverse direction.

The ultrasonic wave generator to be used in the present invention also is not limited to any particular type and various versions that are capable of applying ultrasonic waves to ultrafiltration membranes may be employed, as exemplified by an ultrasonic vibrating plate that is placed around on the entire circumference of the ultrafiltration unit or a plurality of ultrasonic vibrating plates that are spaced around the ultrafiltration unit.

As described in detail on the foregoing pages, the pool water purifying system according to the fourth aspect of the present invention is capable of keeping pool water in a clean condition by removing not only the organic matters such as oils that are excreted from the human body to be contained in the pool water but also bacteria and even smaller particles such as viruses and proteins. Further, by backwashing the ultrafiltration membranes in the ultrafiltration unit, those membranes which are expensive filter media can be used with invariably high filtering efficiency over an extended period without deterioration, whereby the pool water can always be purified with satisfactory results.

The fifth aspect of the present invention relates to an apparatus for purifying pool water and is described below in detail with reference to the preferred embodiments shown in FIGS. 18–21.

Figure 18:
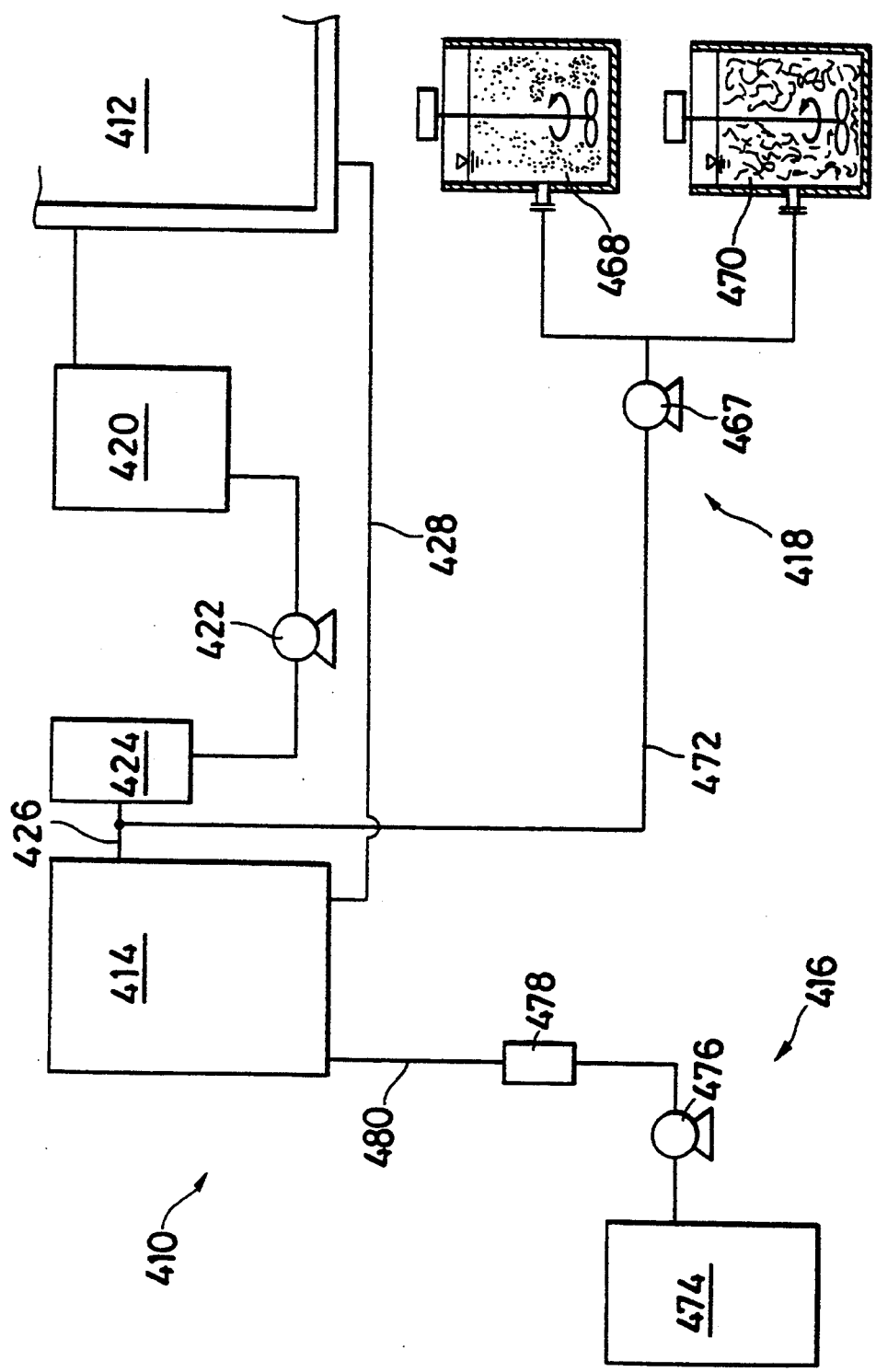
FIG. 18 is a diagram showing the concept of another embodiment of the pool water purifying apparatus of the present invention.

FIG. 18 shows the concept of a system for purifying pool water (as generally indicated by 410) using the pool water purifying apparatus (hereunder referred to simply as "purifying apparatus") according to the fifth aspect of the present invention. Needless to say, valves, cocks, three-way cocks, check valves, solenoid valves and any other devices of the types shown in FIG. 9 should, as required, be provided on the pipes and equipment of the depicted purifying system in order to control the flow paths and amounts of pool water and other fluids, although those devices are neither described in detail nor shown in FIGS. 18–21. Further, as already mentioned, the system may be equipped with a device for heating the pool water, a water storage tank and other optional components.

The purifying system 410 shown in FIG. 18 is capable of purifying the water in a pool 412 in a circulating manner and it consists, basically, of the purifying apparatus 414 of the present invention, a backwashing unit 416 for cleaning the ceramic filters in take purifying apparatus, and a filter aid supply unit 418. In this purifying system 410, the pool water overflowing the pool 412 flows into an overflow tank 420, from which it is forced by a pump 422 to flow into a prefilter 424 where it is freed of hair, dust and other large impurities. The pool water then passes through an entrance line 426 to flow into the purifying apparatus 414 where it is highly purified and thence returned to the pool 412 through a line 428. The prefilter 424 may be selected from among various filters known to be usable with pools, including carbon filters.

The purifying apparatus 414 has at least one purifying unit that contains either an adsorbing means or a disinfecting means or both within a cylindrical filter to form a unitary assembly. The number of purifying units that can be used depends on the quantity of pool water to be treated; they may be arranged on a straight line or alternatively they may be positioned both in the center and on the circumference. The following description assumes a typical case in which the purifying apparatus has one purifying unit.

Figure 19:
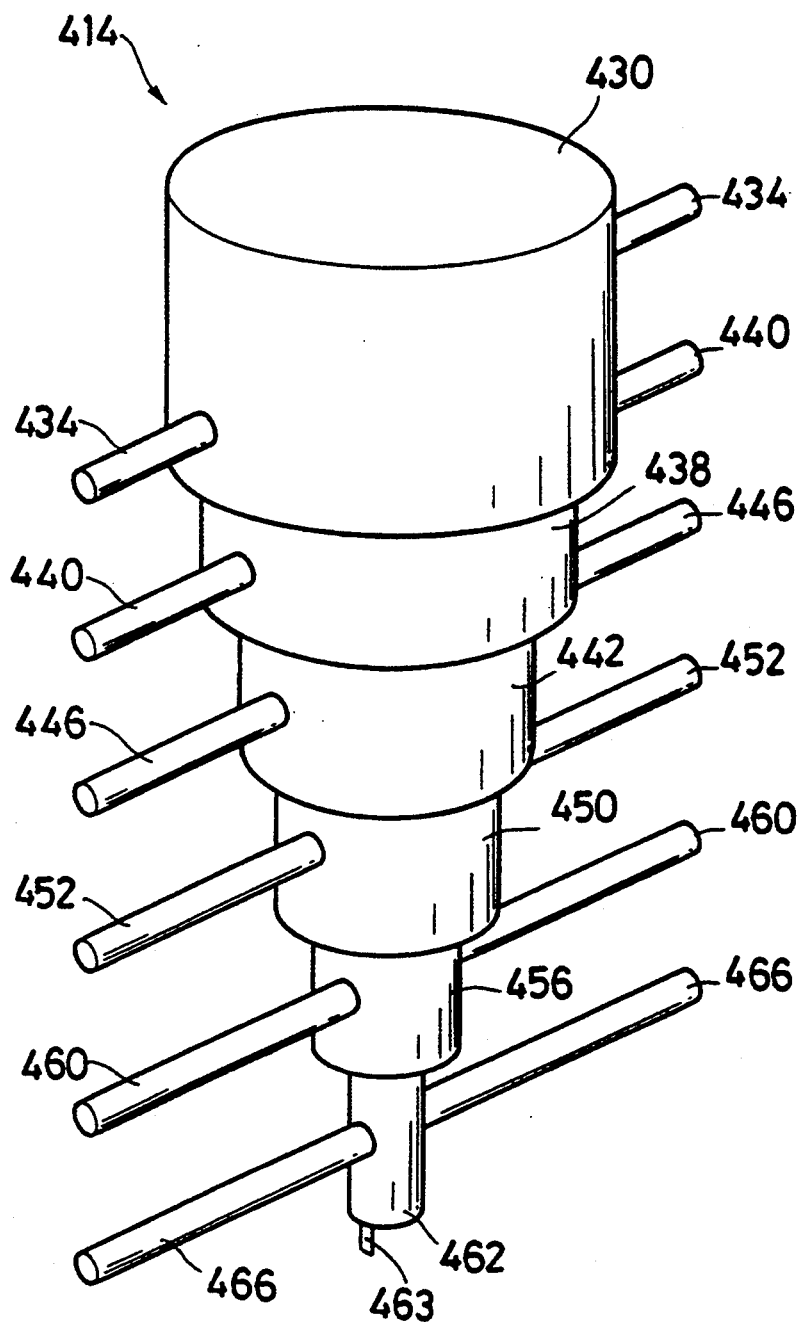
FIG. 19 is a schematic perspective view of an embodiment of the purifying unit used in the purifying apparatus shown in FIG. 18.
Figure 20:
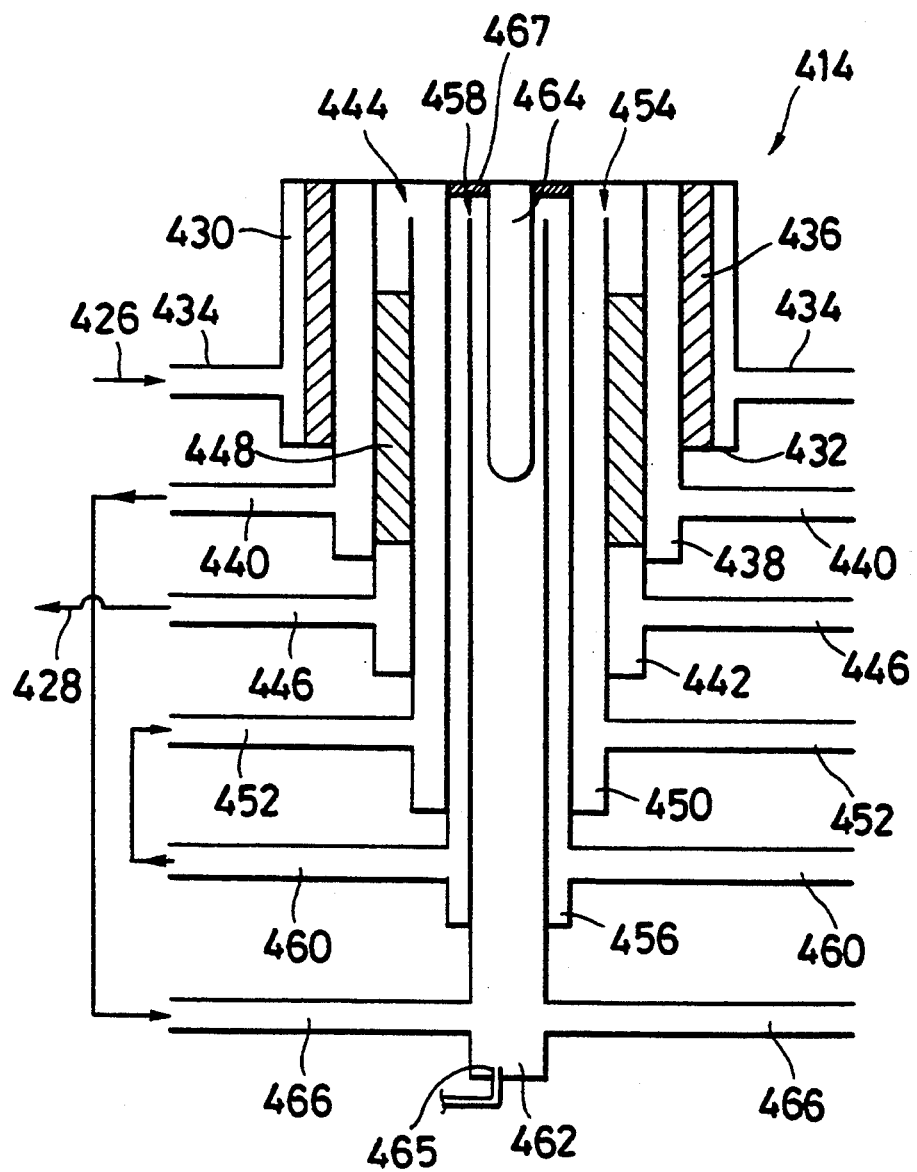
FIG. 20 is a schematic sectional view of the purifying unit shown in FIG. 19.

FIG. 19 is a schematic perspective view of the purifying apparatus 414 and FIG. 20 is a schematic sectional view of the same apparatus. As shown, the apparatus 414 comprises a total of six cylindrical housings. The first housing 430 which is situated on the outermost side has a cylindrical shape closed on its top, with a flange 432 extending inwardly from the bottom. The wall of this housing 430 is provided with inlet pipes 434 that are to be connected to the entrance line 426.

A cylindrical porous ceramic filter 436 (which is hereunder referred to "ceramic filter") is accommodated within the first housing 430 and the pool water, as it passes through the ceramic filter 436 inwardly, is filtered and freed of fine impurities such as oils excreted from the human body. The purifying apparatus according to the fifth embodiment of the present invention is essentially characterized in that an adsorbing and/or disinfecting means of the type described below is accommodated within a cylindrical filter, preferably the ceramic filter 436. The ceramic filter 436 to be used in the purifying apparatus 414 has a three-dimensional network of fine spaces that are highly preferred for filtering the water in pools, particularly in indoor pools and, using this filter, even organic matters such as oils excreted from the human body can advantageously be removed although this has been impossible with the prior art filters.

A second housing 438 is placed inside the first housing 430. The second housing 438 forms a flow channel for the pool water that has passed through the ceramic filter 436. Being cylindrical in shape, the second housing 438 has drain ports 440 in the lower part of the wall through which the pool water is discharged. In this second housing 438, the flow channel for the pool water is provided by the space inside the wall which defines the cylindrical shape of the housing. Hence, the part of the second housing 438 which faces the ceramic filter 436 is open so as to admit the pool water that has passed through the ceramic filter 436.

A third housing 442 is placed inside the second housing 438. This third housing 442 is the same as the second housing 438 in that the flow channel for the pool water is provided by the space inside the wall which defines the cylindrical shape of the housing. An inlet port 444 through which the pool water is admitted from the fourth housing (see below) is provided at the upper end of the inner surface of the wall. The third housing 442 has drain pipes 446 in the lower part of the well that are to be connected to the return line 428 to the pool 412.

The third housing 442 provides an adsorbing means for the purifying apparatus 414 and contains activated carbon 448 (as well as zeolite) so that bacterial cells that are decomposed by the disinfecting means to be described below can be adsorbed and removed from the pool water.

The fourth housing 450 is placed inside the third housing 442. This fourth housing 450 has a cylindrical shape and it is also the same as the second housing 438 in that the flow channel for the pool water is provided by the space inside the wall which defines the cylindrical shape of the housing. The fourth housing 450 has inlet pipes 452 in the lower part of the wall through which the pool water is introduced and at the upper end of the wall, the housing has a drain port 454 through which the pool water is discharged into the third housing.

A fifth housing 456 is placed inside the fourth housing 450. This fifth housing 456 has a cylindrical shape and it is also the same as the second housing 438 in that the flow channel for the pool water is provided by the space inside the wall which defines the cylindrical shape of the housing. An inlet port 458 through which the pool water is admitted is provided at the upper end of the inner surface of the wall and drain pipes 460 are formed at the lower end of the wall.

A sixth housing 462 is placed inside the fifth housing 456. The sixth housing 462 has a cylindrical shape closed at the lower end and contains an ultraviolet lamp unit 464 in the upper part of its interior. Thus, the sixth housing 462 provides a disinfecting means for the purifying means 414. The pool water is vigorously agitated by bubbling with ambient air that is admitted through a nozzle 465 at the lower end and, at the same time, ozone is generated by irradiation with the uv lamp. The combination of the generated ozone and the exposure to uv radiation provides sufficient means of disinfecting the pool water. The sixth housing 462 has inlet pipes 466 formed in the lower part of the wall and an air vent 467 is formed on its top.

The purifying apparatus 414 is constructed by nesting the second to the sixth housings into the first housing 430 in such a way that both activated carbon 448 which is an adsorbing means and lamp unit 464 which is a disinfecting means are accommodated within the cylindrical ceramic filter 436 which is the basic element of the purifying apparatus according to the fifth aspect of the present invention. Because of this arrangement, the purifying apparatus is very compact in spite of it incorporating the adsorbing and disinfecting means. Further, the two means can be integrated into a unitary assembly in a factory, so the work of installation on the site can be greatly facilitated by using this unit.

The purifying apparatus 414 is shown to be composed of six housings but this is not the sole case of the present invention and the apparatus may be composed of more than six or less than six housings. If desired, housings in cassette form may be combined in any desired way to construct the purifying apparatus.

While the purifying apparatus 414 has both an adsorbing and a disinfecting means in a preferred embodiment, it may have either an adsorbing means or a disinfecting means and this embodiment is also included within the scope of the present invention.

It should also be noted that the purifying apparatus according the fifth aspect of the present invention is not limited to the case where only one unitary assembly of the type described above is used and a plurality of such unitary assemblies may be combined together to construct a desired purifying apparatus.

The operation of purifying pool water by means of the apparatus 414 is described below but it is basically the same as the operation of purifying water which is already described in connection with the second aspect of the present invention and, hence, it will be neither shown nor discussed in detail.

The pool water which has been freed of hair, dust and other large impurities in the prefilter 424 passes through the entrance line 426 and inlet pipe 434 to flow into the first housing 430, where it is filtered by passing through the ceramic filter 436 from the outside to the inside. As a result, the pool water is freed of fine impurities such as oils excreted from the human body. Then, it flows into the second housing 438 and leaves in through drain pipe 440.

Subsequently, the pool water flows into the sixth housing 462 through inlet pipe 466 and, as it flows upward, the pool water is disinfected by the combination of ozone and ultraviolet rays generated by the lamp unit 464.

The disinfected pool water flows into the fifth housing 456 through inlet port 458 and flows down to be discharged from the housing through drain pipe 460. Therefore, it flows into the fourth housing 450 through inlet pipe 452 and ascends to drain port 454 (same as inlet port 444 to the third housing) through which it flows into the third housing 442.

As it descends down the third housing 442, the pool water passes through activated carbon 448 (preferably zeolite, too), whereby bacteria that have been decomposed by exposure to ozone and uv radiation are adsorbed on activated carbon 448 and removed from the pool water, which flows into the line 428 through drain pipe 446 to be returned to the pool 412.

The purifying system 410 shown in FIG. 18 has the filter aid supply unit 438 in order to increase the efficiency of filtering with the ceramic filter 36 and to facilitate its backwashing. The unit 418 supplies filter aids (i.e., a powder filter aid, a fibrous filter aid and, optionally, silica gel) into the purifying apparatus 414, specifically onto the outer surface of the ceramic filter 436. To perform this function, the unit 418 comprises a slurry pump 467 capable of feeding a slurry, a tank 468 filled with a mixture of water with a powder filter aid (e.g. diatomaceous earth or lime) or silica gel, a tank 470 filled with a mixture of water with a fibrous filter aid (e.g. cellulose, pulp fiber or asbestos), and a feed line 472 which connects the unit 418 to the entrance line 426.

Layers of the respective filter aids are formed in the following manner: first, the line associated with the layer of the filter aid to be formed is opened in the manner already described hereinabove; then, the slurry pump 467 is run to supply the necessary amount of the mixture of water and the filter aid into the purifying apparatus 414; then, the pump 467 is turned off and the relevant valves are closed; finally, the pump 422 is driven to circulate the mixture in the same manner as in circulating the pool water.

The layers of filter aids thus formed on the outer surface of the ceramic filter 436 effectively prevent its clogging. The purifying system 410 also has the backwashing unit 416 for backwashing the ceramic filter 436. As shown in FIG. 18, the backwashing unit 416 comprises a water storage tank 474, a pump 476 and a jet stream generator 478. This unit 416 is connected to the purifying apparatus 414 with a back wash line 480 that is connected to the drain pipe 440 on the second housing 438. The ceramic filter 436 is backwashed in the following manner: the water in the tank 474 is transported at high speed by means of the pump 476; the water is fed into the jet stream generator 478 where a jet stream is formed; the jet stream is passed through the back wash line 480 and drain pipe 440 to be supplied into the second housing 438, in which it is propelled against the inner surface of the ceramic filter 436. In this way, the filter aids and dust particles are dislodged from the outer surface of the ceramic filter 436.

A pool water purifying system can also be designed using a purifying apparatus that has an ultrafiltration means. An example of this system is described below with reference to FIG. 21 in which the system is generally indicated by 500.

The construction of the pool water purifying system 500 is essentially the same as the system already described hereinabove, except that the purifying apparatus 414 is replaced by a purifying apparatus 502 that is equipped with an ultrafiltration means and a unit for backwashing it. Therefore, the same components are identified by like numerals and will not be described in detail.

Figure 22:
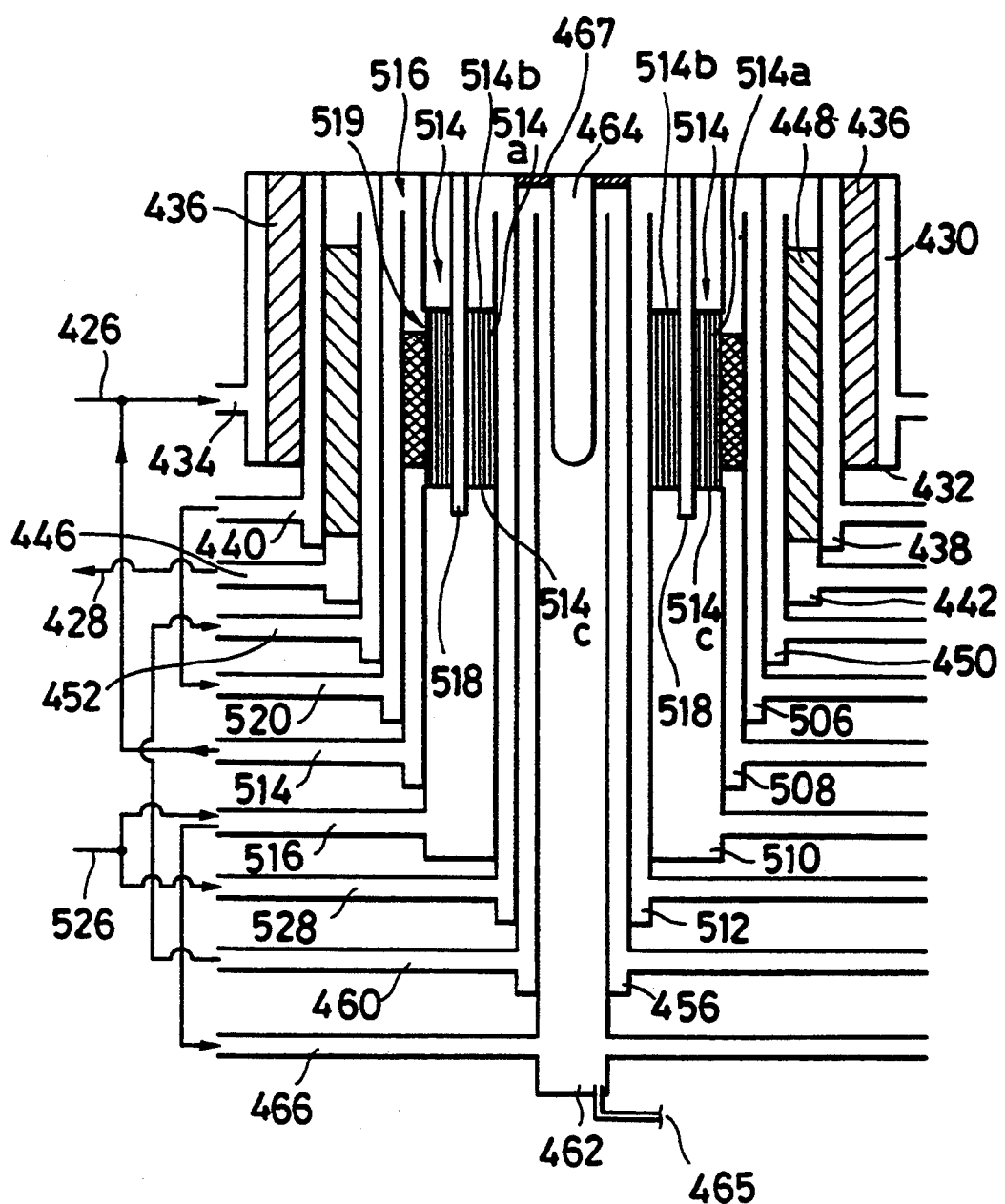
FIG. 22 is a sectional view of an embodiment of the purifying unit used in the purifying apparatus shown in FIG. 21.

As shown more specifically in FIG. 22, the purifying apparatus 502 has an ultrafiltration means added to the purifying apparatus 414 and, similarly, it is composed of a plurality of cylindrical housings combined together in a unitary assembly. In the apparatus 502, four additional housings, namely, the seventh housing 506, the eighth housing 508, the ninth housing 510 and the tenth housing 512, are provided between the fourth housing 450 and the fifth housing 456 so as to form a means of subjecting pool water to ultrafiltration and a means of backwashing this ultrafiltration means.

In the purifying apparatus 414, the pool water that has passed through the ceramic filter 436 then passes through the inlet pipe 466 to be subjected to the disinfecting action of the lamp unit 464. However, in the purifying apparatus 502, the pool water that has passed through the ceramic filter 436 is first subjected to ultrafiltration by an ultrafiltration unit 514 before it is disinfected by the lamp unit 464.

The operation of the purifying apparatus 502 is described below in a more specific way.

The seventh housing 506 is placed inside the fourth housing 450. This seventh housing 506 provides a path for admitting pool water into the ultrafiltration unit 514 and has such a cylindrical shape that the flow path of the pool water is provided by the space inside the wall defining the cylinder. An inlet port 516 is provided on the top of the inner surface of the wall of the seventh housing 506 for introducing the pool water into the eighth housing 508.

The eighth housing 508 is placed inside the seventh housing 506. In the purifying apparatus 502 shown in FIG. 22, not all of the pool water introduced from the seventh housing 506 is subjected to ultrafiltration and part of it will simply flow down the eighth housing 508 without being filtered (it just "overflows" the ultrafiltration unit 514).

The eighth housing 508 provides both a path for supplying the pool water into the ultrafiltration unit 514 and a path for draining the pool water that has overflowed it. An inlet port 516 for introducing the pool water into the ultrafiltration unit 514 is formed on the inner surface of the wall of the eighth housing 508. The eighth housing 508 has a drain pipe 513 connected to an entry line 426 and the pool water overflowing the ultrafiltration unit 514 is drawn again into the purifying apparatus 502 as it is carried by the pool water that is being supplied from the pool 412 into said apparatus 502 via the entry line 426.

Figure 21:
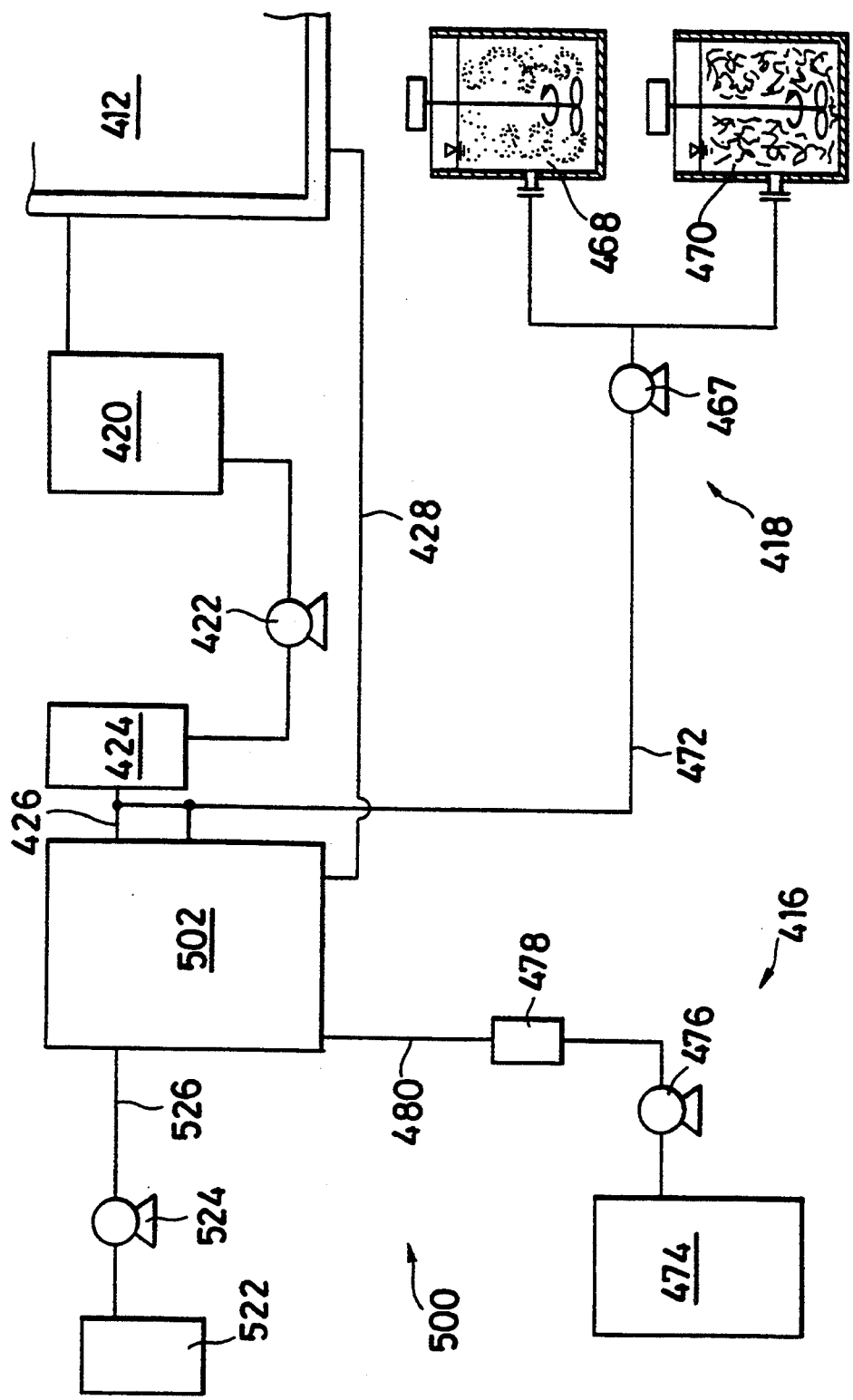
FIG. 21 is a diagram showing the concept of still another embodiment of the pool water purifying apparatus of the present invention.

In the pool water purifying system 500 shown in FIG. 21, a supply line 472 from the filter aid supply unit 418 is connected as a branch of the path from the drain pipe 513 to the entry line 426, so that filter aids such as diatomaceous earth can be supplied in suitable amounts to the ceramic filter 436.

By adopting the arrangement briefly described above, viruses and other small particles that pass through the ceramic filter 436 but which can be separated from the pool water by the ultrafiltration unit 514 to be detailed below can be effectively separated by the combined action of diatomaceous earth and ceramic filter 436, offering the advantage of markedly extending the interval between cycles of cleaning (backwashing) the ultrafiltration unit 514.

The ninth housing 510 is placed inside the eighth housing 508. This ninth housing 510 retains the ultrafiltration unit 514 and forms a flow path for the pool water that has been subjected to ultrafiltration. As shown in FIG. 22, the ultrafiltration unit 514 consists basically of a vertical hollow fiber membrane 514a that is provided concentrically with the ninth housing 510, as well as a top face 514b and a bottom face 514c that have the same cross-sectional shape as the ninth housing 510, with holes being made at open ends, both top and bottom, of the hollow fiber membrane 514a.

With the ultrafiltration unit 514 having this construction, the pool water admitted through the inlet port 516 passes through the hollow fiber membrane 514a inwardly, then flows down to leave the bottom of the membrane and keeps flowing down the ninth housing 510. Since viruses and other fine particles are unable to pass through the hollow fiber membrane 514a, they are separated from the pool water. The filtered pool water that is free of viruses and other fine particles passes through a drain pipe 516 to flow into the sixth housing 462.

In the purifying apparatus 502 shown in FIG. 21, the ultrafiltration unit 514 is equipped with an ultrasonic wave generator 518 that facilitates the backwashing of said unit. The ultrasonic wave generator 518 is supposed by the top face of the first housing 432 and penetrates through the top face 514b and bottom face 514c of the ultrafiltration unit 514. As the ultrafiltration unit 514 is used cyclically, the hollow fiber membrane 514a will be clogged by separated viruses and other fine particles to reduce the processing capability of the unit 514. Hence, in order to maintain its desired performance, the ultrafiltration unit 514 (especially the hollow fiber membrane 514a) must be cleaned periodically. To this end, the purifying apparatus 502 shown in FIG. 21 is equipped with a backwashing means.

The tenth housing 512 is placed inside the ninth housing 510. The tenth housing 512 provides a path for introducing the cleaning water to be used in backwashing the ultrafiltration unit 514 and, at its top, the tenth housing 512 is connected to the ninth housing 510.

The purifying apparatus 502 purifies the pool water in the following manner. As already mentioned, this apparatus is the combination of the purifying apparatus 414 and the ultrafiltration means 514 and, except for this point, the apparatus 502 operates in essentially the same way as the apparatus 414. Therefore, the following description centers on the operation of the ultrafiltration means 514 and the other features of the apparatus 502 will not be discussed in detail.

The pool water that has passed through the ceramic filter 436 in the same manner as in the purifying apparatus 414 passes through the drain pipe 440 on the second housing 438 to flow into the seventh housing 506 via the inlet pipe 520. The incoming pool water ascends through the seventh housing 506 and flows into the eighth housing 508 via the inlet port 516. As already mentioned, not all of the pool water flowing into the eighth housing 508 is subjected to ultrafiltration and only part of it undergoes ultrafiltration by the ultrafiltration unit 514 while the other portion simply overflows said unit 514 and descends through the eighth housing 508.

The pool water flowing into the ultrafiltration unit 514 passes through the hollow fiber membrane 514a to be freed of viruses and other fine particles and subsequently descends through the membrane 514a to leave the ultrafiltration unit 514. Thereafter, the pool water descends through the ninth housing 510, leaves it via drain pipe 516 and flows into the sixth housing 462 via inlet pipe 466. The subsequent stages of purifying the pool water are identical to those of the operation of the apparatus 412.

The overflowing pool water which has not been subjected to ultrafiltration flows down the eighth housing 508 and leaves it via drain pipe 513 to be recycled to the purifying apparatus 502 as it is drawn into the entry line 426 by the pool water which is flowing out of the pool 412 into the apparatus 502.

As already mentioned, in the purifying apparatus 502 shown in FIG. 21, the filter aid supply line 472 is connected as a branch of the path from the drain pipe 513 to the entry line 426, so that filter aids such as diatomaceous earth can be supplied in suitable amounts to the ceramic filter 436. This arrangement enables viruses and other fine particles in the overflowing pool water to be effectively separated by the ceramic filter 436 since they are adsorbed on the supplied diatomaceous earth and other adsorbents.

In order to perform efficient ultrafiltration in the purifying apparatus 502, the pool water must be supplied to the ultrafiltration unit 514 (especially, the hollow fiber membrane 514a) at a pressure higher than a certain level. To meet this requirement, the flow of the pool water from the eighth housing 508 is controlled in such a way that the pool water can always be supplied to the ultrafiltration unit 514 at a pressure within a predetermined range.

The backwashing unit incorporated into the system shown in FIG. 21 consists basically of a tank 522 filled with cleaning water, a pump 524, a back wash line 526, the tenth housing 512, the ninth housing 510, the eighth housing 480 and the ultrasonic wave generator 518. The hollow fiber membrane 514a in the ultrafiltration unit 514 is backwashed as it is vibrated by ultrasonic waves applied from the ultrasonic wave generator 518.

In the purifying apparatus 502, the process of backwashing the ultrafiltration unit 514 starts with running the pump 524 so That the cleaning water in the tank 522 is supplied via the back wash line 526. The back wash line 526 is connected both to the drain pipe 516 on the ninth housing 510 and to the inlet pipe 528 on the tenth housing 512. The cleaning water supplied into the ultrafiltration unit 514 via those pipes get into the hollow fiber membrane 514a from both top 514b and bottom 514c and passes through the membrane outwardly, to thereby dislodge viruses and other fine impurities that have been adsorbed on the outer surface of the membrane 514a. The cleaning fluid as the permeate which contains viruses and other impurities flows into the eighth housing 508 via inlet port 519 and leaves the ultrafiltration unit 514 by way of a drain path (not shown).

As described above in detail, the pool water purifying apparatus according to the fifth aspect of the present invention which has a porous ceramic filter, a disinfecting means, an adsorbing means, plus an ultrafiltration means achieves an extremely high filtering efficiency and yet it is very compact in size. Further, those components can be integrated into a unitary assembly in a factory, so the work of installation on the site can be greatly facilitated by using this unit.

The sixth aspect of the present invention relates to a system for purifying pool water and it is described below in detail with reference to the preferred embodiments shown in FIGS. 23-25.

Figure 23:
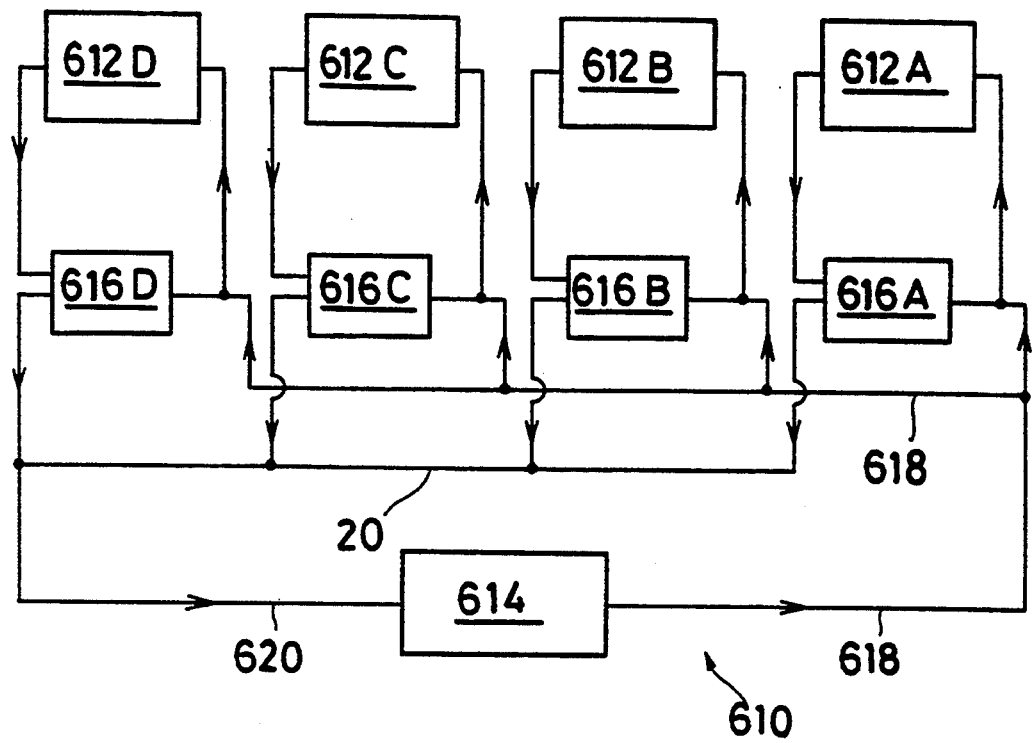
FIG. 23 is a of diagram showing the concept of still another embodiment of the pool water purifying system of the present invention.

FIG. 23 is a diagram showing the concept of this pool water purifying system (which is hereinafter referred to simply as the "purifying system"). Although not described below, valves, cocks, three-way cocks, check valves, solenoid valves and other components may, of course, be provided as required for the piping and equipment of the purifying system shown in FIG. 23 in order to control the various flow paths of the pool water.

The purifying system generally indicated by 610 in FIG. 23 is intended to purify the water in four pools 612A, 612B, 612C and 612D having different temperatures (the term "water" as it appears below without any qualifier shall refer to "pool water"). The system comprises a purifying apparatus 614 that is connected to the four pools for purifying the water in those pools, and four prefiltration units 616A, 616B, 616C and 616D that are connected to the respective pools for filtering the water in those pools.

In the purifying system 610, the purifying apparatus 614 supplies each pool with purified water through a feed line 618 and receives the water from each pool after it passes through the prefiltration unit connected to that pool.

Figure 24:
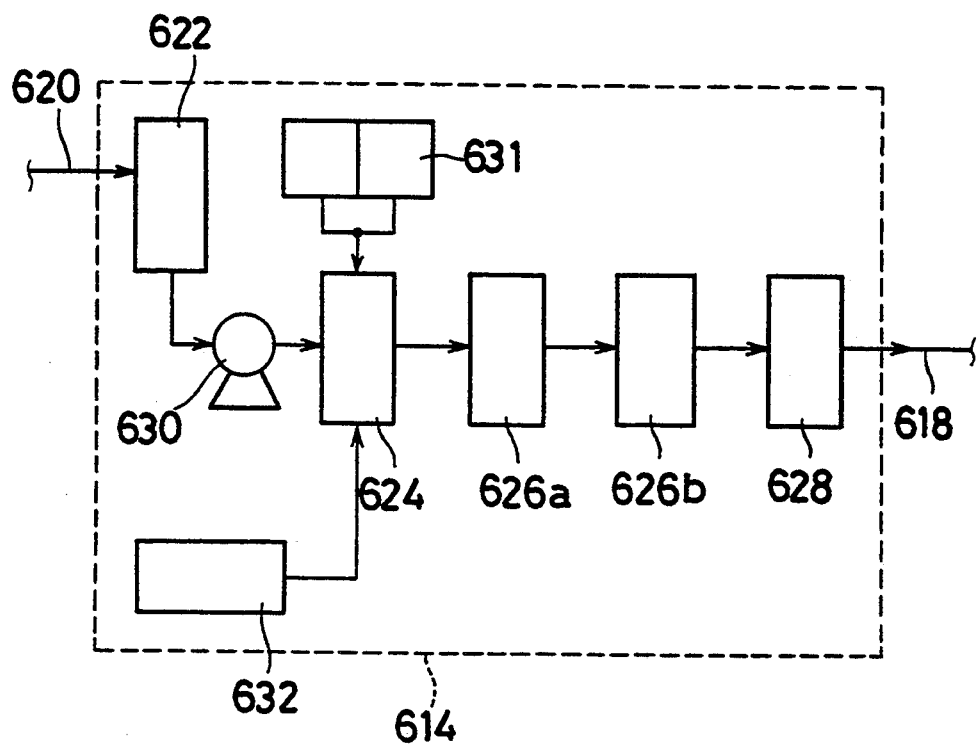
FIG. 24 is a diagram showing the concept of an embodiment of the purifying apparatus used in the purifying system shown in FIG. 23.

FIG. 24 is a diagram showing the concept of the purifying apparatus 614. As shown, the apparatus 614 consists basically of a prefilter 622, a ceramic filter assembly 624, disinfecting tanks 626a and 626b, an adsorption tank 628, and a circulating pump 630. Needless to say, the purifying apparatus 614 may be of the unitary assembly type described in connection with the fifth aspect of the present invention.

In the system shown in FIG. 23, the water in each pool is first passed through the associated prefiltration unit before it flows into the purifying apparatus 614 via the feed line 620. The water flowing into the apparatus 614 is first introduced, either by suction with the circulating pump 630 or by the "head" with respect to the pool under treatment, into the prefilter 622 where it is freed of hair, dust and other large impurities. Subsequently, the water flows into the circulating pump 630, leaves it and then flows into the ceramic filter assembly 624. The ceramic filter assembly 624 contains in it a plurality of cylindrical ceramic filters and the water, as it passes through these ceramic filters inwardly, is filtered and fine impurities such as oils excreted from the human body are removed. In addition, unlike the conventional filters, the ceramic filters do not depend on water temperature for their performance and hence are capable of efficient filtration of the water regardless of its temperature.

In the purifying system 610 under consideration, ceramic filters are used in the purifying apparatus 614 and a prefiltration unit is provided for each of the pools to be treated; because of this arrangement, the water in a plurality of pools having different water temperatures can be highly purified with a single unit of the purifying apparatus, thereby reducing the investment and running costs of the whole purifying system.

The water leaving the ceramic filter assembly 624 flows into the disinfecting tanks 626a and 626b for disinfection purposes. The disinfecting tanks 626a and 626b, which disinfect the water by the combined application of ozone and ultraviolet radiation, are each furnished with an ultraviolet lamp and an ozone lamp. The water is vigorously agitated by bubbling with ambient air and, at the same time, ozone is generated by irradiation with the uv lamp. The combination of the generated ozone and the exposure to uv radiation provides a very effective means of disinfecting the water in the purifying apparatus 614.

The disinfected water then flows into the adsorption tank 628. The adsorption tank 628 is packed with activated carbon and zeolite, which adsorb bacteria and other microorganisms that have been decomposed in the disinfecting tanks 626a and 626b, whereby those impurities are rejected from the water.

The water leaving the adsorption tank 628 is supplied into each pool via the supply line 618.

In the purifying apparatus 614 shown in FIG. 24, a filter aid tank 631 is connected to the ceramic filter assembly 624. Thus, in the case shown, the means of filtering the pool water is composed of the prefilter 622, ceramic filter assembly 624, and a filter aid supply means including the filter aid tank 631. The filter aid tank 631 consists of two vessels, one being filled with a mixture of water and a powder filter aid (e.g. diatomaceous earth) and the other being filled with a mixture of water and a fibrous filter aid (e.g. pulp fibers).

The purifying apparatus 614 is also equipped with a unit 632 for backwashing the ceramic filter assembly 624.

Since the purifying system 610 under discussion uses the purifying apparatus 614 having the construction described above, it is capable of purifying and disinfecting the water to to a level that has been unattainable by the prior art, whereby the water in various pools can be held in a very clean condition. Needless to say, the system may be furnished with auxiliary tanks, heat exchangers, etc. as required.

In ordinary situations, the purifying system 610 purifies the pool water by means of the prefiltration units connected to the respective pools of interest. The pools and the associated prefiltration units incorporated in the system shown in FIG. 23 have basically the same construction, so the following description which centers on pool 612A and prefiltration unit 616A should also apply to the other pools and prefiltration units.

Figure 25:
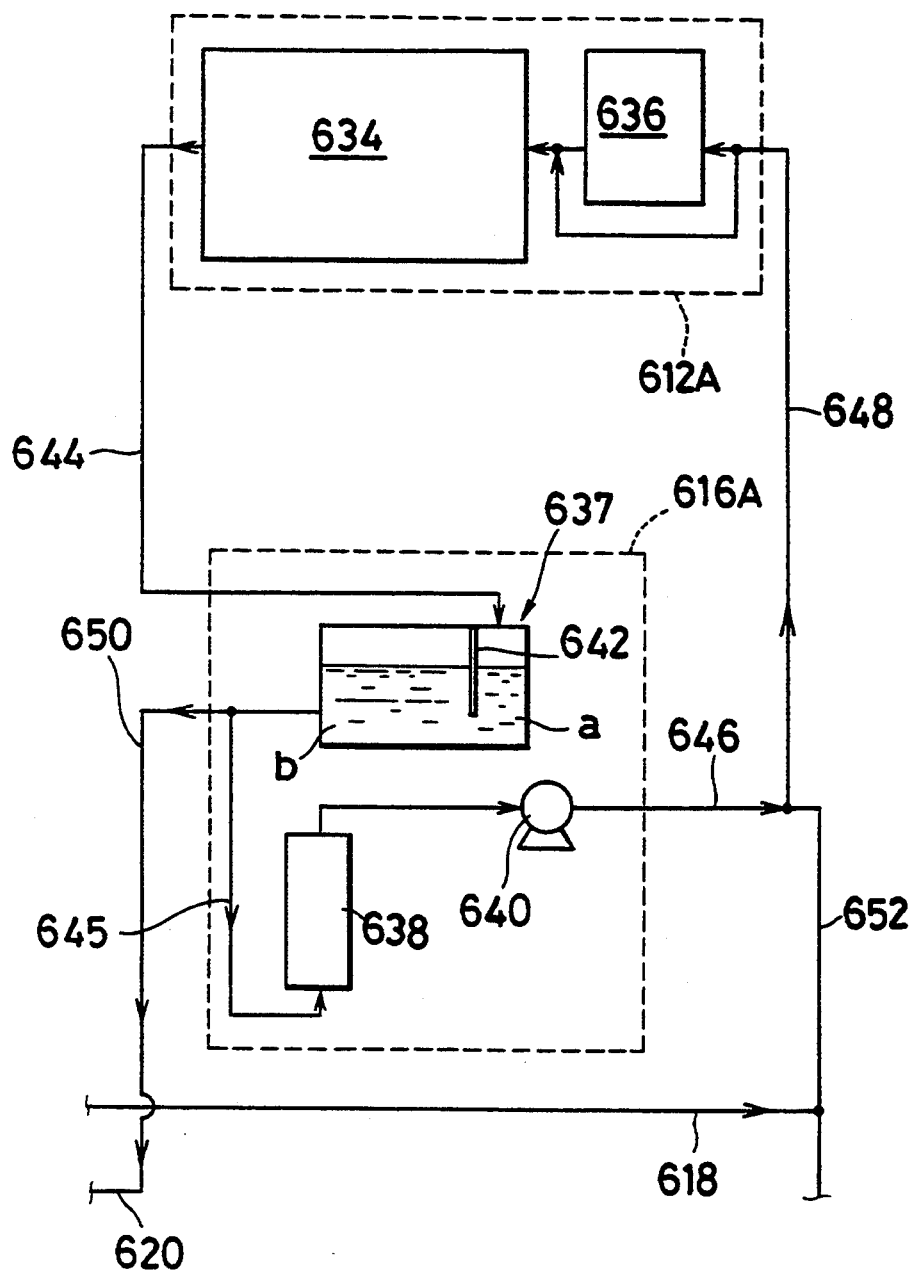
FIG. 25 is a diagram showing the concept of an embodiment of the prefiltration unit used in the purifying system shown in FIG. 23.
Figure 26:
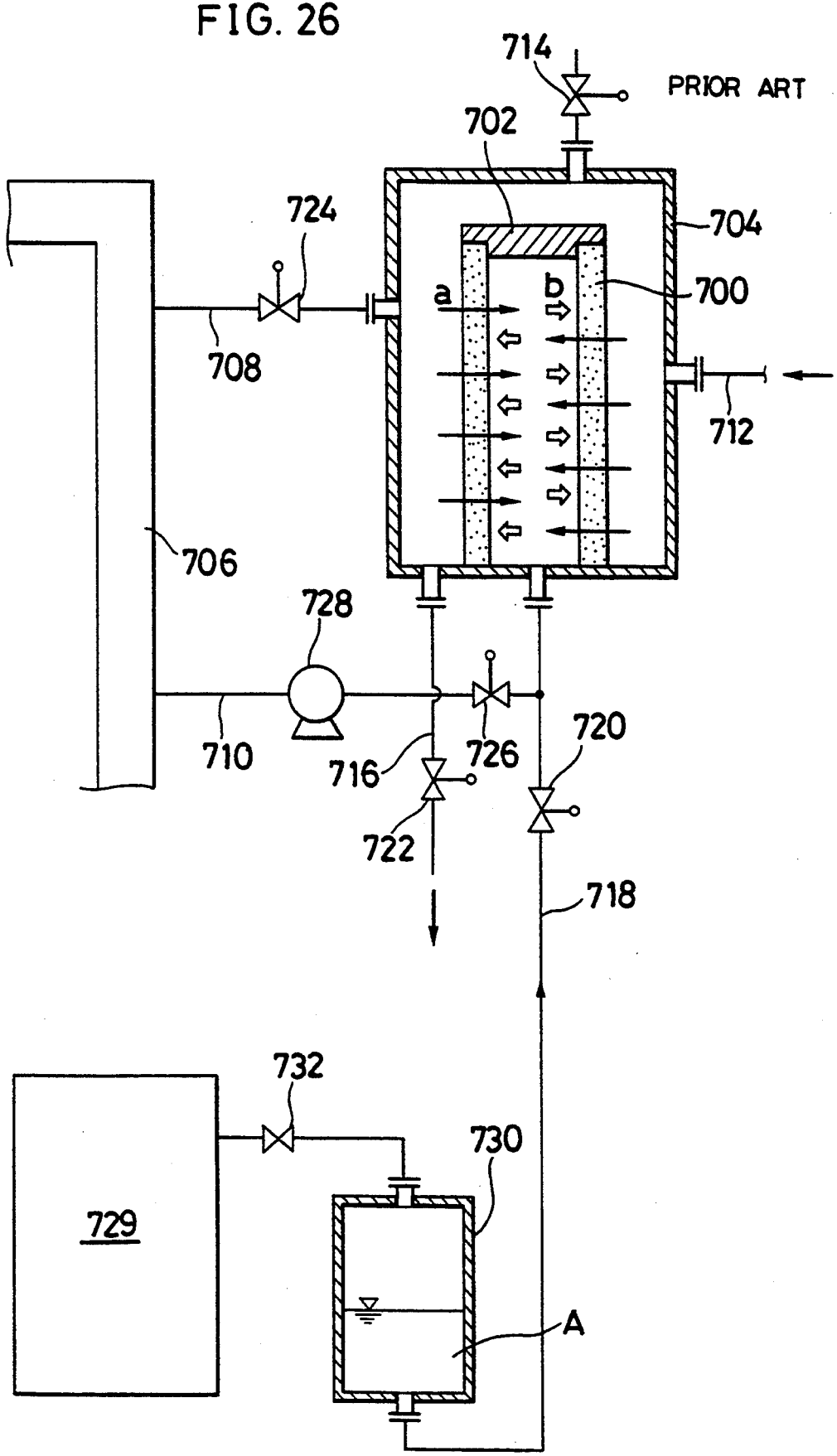
FIG. 26 is a diagram showing the concept of a system for filtering pool water using a prior art method of cleaning porous ceramic filters.

FIG. 25 is a diagram showing the concept of pool 612A and prefiltration unit 616A. Pool 612A comprises basically a tank 634, a heat exchanger 636 connected to a boiler and other components, a NaOH and Cl supplier (not shown), etc. The pool water is held at a predetermined temperature by being passed through the heat exchanger 636 as required in a circulation mode.

Prefiltration unit 616A which purifies the water in pool 612A comprises basically an overflow tank 637 which provides a temporary storage for the water overflowing the tank 634, a carbon filter tank 638 that filters the water stored in the overflow tank 637, and a pump 640 which is a means of circulating the water in pool 612A. The overflow tank 637 has a suspended partition 642 that divides the interior of the tank into two vessels, an upstream vessel a and a downstream vessel b. The water flowing through an overflow line 644 is admitted into vessel a, whereas vessel b is connected to the carbon filter tank 638.

impurities in the pool water may be removed by filters as exemplified by dust and hair but equally abundant are those impurities which are lightweight and float on the water, as exemplified by oils excreted from the human body. Therefore, if the overflow tank 637 which is partitioned in the way described above is used, most impurities can be captured in the upper part of vessel a while the water in the lower part of the vessel b is admitted into the carbon filter tank 638 and this insures that the water in pool 612A is kept clean without operating the purifying apparatus 614 in all instances. Another advantage of the overflow tank 637 is that the water stored in it can be used to adjust the volume of the water in pool 612A, thereby eliminating the need of providing a balancing tank which has been indispensable to the existing pools for controlling the quantity of pool water. The impurities collecting in the overflow tank 637 may be removed at a later stage when the water in pool 612A is purified with the apparatus 614.

The carbon filter tank 638 uses carbon filters to remove dust and other impurities that will not float on the surface of the water. Carbon filters are filter media that are capable of trapping ordinary fine particles and hair, dust and other unwanted impurities are removed by such carbon filters. It should, however, be noted that filter media that can be used in the prefiltration units are by no means limited to carbon filters and various kinds of filters that are used in ordinary pool purifying equipment may be employed.

The thus purified water is supplied to pool 612A by means of pump 640.

The specific operations for purifying the water in pools 612A-612D in the purifying system 610 are described below.

In ordinary situations, the system is sequence-controlled automatically in accordance with a preset program for purifying (filtering) the water in prefiltration units 616A-616D that are connected to the individual pools. The system's operation is described below with pool 612A being taken as an example.

The water overflowing the tank 634 passes through the overflow line 644 to flow into vessel a in the overflow tank 637. As already mentioned, the interior of the overflow tank 637 is divided into two sections by the partition 642 suspended from above; thus, lightweight impurities such as oils excreted from the human body collect in the upper part of vessel a and only the clean water in the lower part of vessel a will move toward vessel b. The water moving to vessel b flows into the carbon filter tank 638 through line 645, either by the "head" or by the suction of pump 640. In the carbon filter tank 638, hair, dust and other impurities are removed by the carbon filters and the resulting clean water is returned to pool 612A though lines 646 and 648. If the temperature of the water is lower than a predetermined level, it is passed though the heat exchanger 636 before returning to tank 634; if the water temperature is equal to or higher than the predetermined level, the water bypasses the heat exchanger 636 and is directly returned to the tank 634.

In ordinary situations, the purifying system 610 purifies the water by means of prefiltration units 616A-616D connected to the individual pools 612A-612D in the manner described above.

If the continuous operation of the prefiltration units 616A-616D for purifying the water exceeds a predetermined duration, or if it is found by sensor or some other suitable means that the water has become more foul than is permissible, the path of water circulation is shifted from the individual prefiltration units to the purifying apparatus 614 and enhanced water purification is performed.

This mode of water purification is described below with reference to pool 612A. Suppose here that the continuous operation of prefiltration unit 616A for purifying the water exceeds a prescribed time or that it is found by a sensor or some other means that the water in pool 612A has become more foul than is permissible. Then, pump 640 is turned off, lines 645 and 646 are closed, a line 650 connecting to an entry line 620 is opened, and the water in the overflow tank 636 flows into the purifying apparatus 614 through line 650 and entry line 620. If the situation is such that the purifying apparatus 614 has been operated to purify the water in another pool, say, pool 612D, in a circulating manner, the entry line to the purifying apparatus 614 from the overflow tank in the prefiltration unit 616D associated with the pool 612D is closed simultaneously with the opening of lien 650, whereas the entry line for circulation from the pool 612D to the prefiltration unit 616D is opened. However, before all of the water from pool 612D that remains in the purifying apparatus 614 and in the associated lines has been returned to the pool 612D, the supply line from the purifying apparatus 614 to the pool 612D is not closed, nor is opened the line of circulation from the prefiltration unit 616D to the pool 612D.

Consider here the case where the volume of water in the overflow tank 637 associated with pool 612A has become smaller than a predetermined level (e.g. the level of that water becomes lower than the partition 642) and where the purifying apparatus 614 is operating to purify the water in another pool, say, pool 612D, in a circulating manner. If, in this case, all of the water in pool 612D that remains in the purifying apparatus 614 and in the associated lines is returned to the pool 612D, then the line to the pool 612D connected to the feed line 618 is closed and, at the same time, a line 652 no the pool 612A which is connected to the feed line 618 is opened, whereupon highly purified water is supplied from the purifying apparatus 614 to the pool 612A.

If the temperature of the water supplied from the purifying apparatus 614 is below a predetermined level, it may be passed through the heat exchanger 636 to be heated to the predetermined temperature before it is supplied to the tank 634.

Needless to say, the operations of switching one line to another or those of opening and closing lines should preferably be conducted gradually enough to avoid "water knocking".

The water flowing into the purifying apparatus 614 is first freed of dust and other large impurities by the prefilter 622 and then supplied into the ceramic filter assembly 624 where it is freed of fine impurities such as oils excreted from the human body. Subsequently, the water is disinfected by ultraviolet radiation and ozone in the disinfecting tanks 626a and 626b and thence supplied into the adsorption tank 628 for removal of bacteria and other fine impurities. The resulting clean water is supplied to pool 612A via lines 618, 652 and 648.

When the purification of the water in pool 612A by means of the purifying apparatus 614 ends, the line of water purification is switched again to the prefiltration unit 616A and then switched to the prefiltration unit (616B, 616C or 616D) that is associated with another pool the water in which should be highly purified, as well as to the purifying apparatus 614.

The switching between individual prefiltration units 616A–616D and the purifying apparatus 614 may be sequence-controlled automatically in accordance with a preset timing chart or program or, alternatively, it may be conducted on the basis of the results of detecting the degree of fouling of the pool water with various sensors. If desired, the two control systems may be combined in such a way that the switching operations are sequence-controlled in ordinary situations but when the quantity of the water in a certain pool decreases or if it becomes very dirty for some reason such as the use of that pool by many bathers at a time, the water in that particular pool is first purified in preference over the other pools and the system is returned to sequence control after the purification of that water ends. The timing chart or program for sequence control may be constructed in an optimal way by performing preliminary experiments. Needless to say, such timing chart and program may be modified as appropriate for various factors such as the status of a specific operation of water purification.

The pool water purifying system of the present invention is not limited to the particular embodiment described above and various other system arrangements may be adopted in accordance with such factors as the use and scale of the pools to be treated; for example, additional filtration tanks or disinfecting tanks may be added, or unnecessary components may be eliminated from the system, or an entirely different type of the purifying apparatus may be added to the system. In the embodiment described above, only one unit of the purifying apparatus is used but it should be noted that depending upon factors such as the number of pools to be treated and the scale of the purifying apparatus, more than one unit of the purifying apparatus may be used as required.

As described above in detail, the pool water purifying system of the present invention has the advantage that the water in a plurality of pools having different water temperatures such as those used in a Kurhaus can be purified by a single unit of purifying apparatus and, therefore, the investment and running costs of the purifying system can be substantially reduced.

While the apparatus of the present invention for purifying pool water and the system that uses it have been described in detail on the foregoing pages with reference to the preferred embodiments, it should be noted that various improvements and modifications can be made without departing from the spirit and scope of the invention as recited in the appended claims.

What is claimed:

1. A circulating purification apparatus comprising:
a filtration tank that uses porous ceramic filters and that is equipped with a means for backwashing said porous ceramic filters, said backwashing means having a mixing unit for producing a water stream as a mixture with high-pressure air for cleaning the filters in said filtration tank; a disinfecting tank, an adsorption tank containing an adsorption medium that adsorbs impurities from a circulating fluid, a main pipeline through which the circulating fluid flows, an inlet pipe and an outlet pipe connecting the main pipeline and each of said tanks, switch valves provided in said inlet pipes and in said outlet pipes and in said main pipeline between the junctions of said inlet and outlet pipes with said main pipeline, a source of the circulating fluid which is connected to the entrance and exit ends of said main pipeline, and a pump for circulating the circulating fluid in said main pipeline.

2. An apparatus according to claim 1, wherein said source of circulating fluid is a pool and said circulating fluid is pool water.

3. A system for purifying pool water using the circulating purification apparatus of claim 2, which system has said pool, said pump, said filtration tank, said disinfecting tank and said adsorption tank arranged in that order to form a circulation line, said system further including a drain line fitted with a switch valve that is a branch from said circulation line, as well as a back wash line comprising said mixing unit having an inlet branch pipe fitted with a switch valve that is connected between said pump and said filtration tank and an outlet branch pipe fitted with a switch valve that is connected to the outlet pipe from said filtration tank, and a drain pipe fitted with a switch valve that is connected to the inlet pipe to said filtration tank.

4. A system according to claim 3, which further includes a precoat line having a precoating tank fitted with a switch valve that forms the circulation path together with said pump and said filtration tank and an adsorption tank cleaning line that performs backwashing from the exit to the entrance side of said adsorption tank, the switch valves for effecting shifting among said circulation line, said drain line, said back wash line, said precoat line and said adsorption tank cleaning line being formed of solenoid valves, said system further including a control unit for selectively opening or closing said solenoid valves in association with either one of said lines.

5. An apparatus for purifying pool water in a circuit, which comprises a platform, a means for filtering pool water flowing in said circuit, said filtering means being fixed in a predetermined position on said platform, said means for filtering pool water having porous ceramic filters for removing fine impurities from said pool water in said circuit, prefilters that are provided upstream of said ceramic filters in the path of pool water circulation in said circuit, and a unit for supplying said ceramic filters with a filter aid, an adsorbing means in said circuit, a disinfecting means in said circuit for disinfecting pool water by the combination of ozone and ultraviolet radiation, means for backwashing said porous ceramic filters, a circulating means for circulating pool water in said circuit, and means for providing connections between said circuit and an external path of flowing water, said platform being splittable into at least two segments, and joining portions of said connecting means being rotatable in a horizontal plane to be set in a desired position.

6. An apparatus according to claim 5, wherein said backwashing means has a mixing means that generates a high-speed two-phase stream by jetting high-pressure air into a cleaning fluid accelerated by a circulation line.

* * * * *